US011974365B2

(12) United States Patent
Dressendofer et al.

(10) Patent No.: US 11,974,365 B2
(45) Date of Patent: Apr. 30, 2024

(54) WIRELESS SUPERNETWORK FOR DENSE ENVIRONMENTS

(71) Applicant: Slice Wireless Solutions, New York, NY (US)

(72) Inventors: Jo-Anne Dressendofer, Point Pleasant, NJ (US); Daniel Minoli, Red Bank, NJ (US); John Edward Hutzler, New York, NY (US); Edward Charles Wright, New York, NY (US)

(73) Assignee: Slice Wireless Solutions, New York, NY (US)

( * ) Notice: Subject to any disclaimer, the term of this patent is extended or adjusted under 35 U.S.C. 154(b) by 306 days.

(21) Appl. No.: 17/589,374

(22) Filed: Jan. 31, 2022

(65) Prior Publication Data
US 2022/0248499 A1 Aug. 4, 2022

Related U.S. Application Data

(60) Provisional application No. 63/143,572, filed on Jan. 29, 2021.

(51) Int. Cl.
*H04W 88/16* (2009.01)
*H04W 48/08* (2009.01)
(Continued)

(52) U.S. Cl.
CPC .......... *H04W 88/16* (2013.01); *H04W 48/08* (2013.01); *H04W 48/16* (2013.01); *H04W 72/29* (2023.01)

(58) Field of Classification Search
None
See application file for complete search history.

(56) References Cited

U.S. PATENT DOCUMENTS 4,872,159 A  10/1989 Hemmady et al.
5,351,146 A   9/1994 Chan et al.
(Continued)

FOREIGN PATENT DOCUMENTS

CN  204795620 U  11/2015
KR  20160087171 A  7/2016

OTHER PUBLICATIONS

Minoli et al., "The Age of Wi-Fi and Rise of the Wireless SuperNetwork (WISNET)TM," Wiley, 2021, 26 pages.
(Continued)

*Primary Examiner* — Hong S Cho
(74) *Attorney, Agent, or Firm* — Kintner IP, LLC; Mary Frances Ludwig

(57) ABSTRACT

A wireless supernetwork (WiSNET), or a superintegrated network, allows multiple network technologies to plug and play into one open wired and wireless network, particularly serving dense user environments. WiSNET allows the redirection of independently deployed technologies and provides improved network efficiency, affordability, and user convenience. In embodiments, WiSNET integrates input data from two or more disparate service providers. The WiSNET includes a service delivery system, a data aggregation system that provides aggregated input data, and a local delivery system that transmit the aggregated input data to multiple categories of user via a superintegrated access platform. A superintegrated management system enables assignment of a network slice and/or a service slice to each of a plurality of user profiles.

20 Claims, 15 Drawing Sheets

(51) Int. Cl.
*H04W 48/16* (2009.01)
*H04W 72/29* (2023.01)

(56) References Cited

U.S. PATENT DOCUMENTS

| | | | |
|---|---|---|---|
| 5,418,779 A | 5/1995 | Yemini et al. | |
| 6,614,781 B1 | 9/2003 | Elliott et al. | |
| 6,738,358 B2 | 5/2004 | Bist et al. | |
| 6,823,318 B1 | 11/2004 | Creswell et al. | |
| 6,954,455 B1 | 10/2005 | Al Hakim et al. | |
| 6,963,627 B1 | 11/2005 | Radi | |
| 7,042,841 B2 | 5/2006 | Abdelilah et al. | |
| 7,068,601 B2 | 6/2006 | Abdelilah et al. | |
| 7,072,344 B2 | 7/2006 | Abdelilah et al. | |
| 7,283,561 B1 | 10/2007 | Picher-Dempsey | |
| 7,453,858 B2 | 11/2008 | Csapo et al. | |
| 7,564,840 B2 | 7/2009 | Elliott et al. | |
| 7,855,966 B2 | 12/2010 | Abdelilah et al. | |
| 8,036,214 B2 | 10/2011 | Elliott et al. | |
| 8,085,761 B2 | 12/2011 | Elliott et al. | |
| 8,089,958 B2 | 1/2012 | Elliott et al. | |
| 8,270,421 B2 | 9/2012 | Elliott et al. | |
| 8,295,280 B2 | 10/2012 | Gopalakrishna et al. | |
| 8,565,758 B2 | 10/2013 | Owyang et al. | |
| 8,649,498 B1 | 2/2014 | Rankin et al. | |
| 8,693,347 B2 | 4/2014 | Elliott et al. | |
| 9,025,533 B1 | 5/2015 | Lok et al. | |
| 9,338,190 B2 | 5/2016 | Eng et al. | |
| 9,386,158 B2 | 7/2016 | Wood et al. | |
| 9,942,410 B2 | 4/2018 | Wood et al. | |
| 10,354,346 B1 | 7/2019 | Lok et al. | |
| 10,623,955 B2 | 4/2020 | Zalzalah et al. | |
| 10,895,648 B2 | 1/2021 | Moeglein et al. | |
| 10,943,313 B2 | 3/2021 | Lok et al. | |
| 2004/0039772 A1* | 2/2004 | De Miguel | H04M 3/42153 709/201 |
| 2004/0039807 A1* | 2/2004 | Boveda De Miguel | H04M 3/42272 709/223 |
| 2017/0070923 A1 | 3/2017 | Li et al. | |
| 2020/0336884 A1 | 10/2020 | Casas et al. | |

OTHER PUBLICATIONS

Minoli et al., "Practical Aspects for the Integration of 5G Networks and IoT Applications in Smart Cities Environments, Integration of 5G Networks and Internet of Things for Future Smart City," Wireless Communications and Mobile Computing. vol., 43 pages, Aug. 2019.

D. Minoli, "IoT Applications to Smart Campuses and a Case Study," EAI (European Alliance for Innovation) Endorsed Transactions on Smart Cities, European Union Digital Library, ISSN 2518-3893 vol. 2., Dec. 2017, 2 pages.

Nokia, "Network Slicing Explained," Feb. 2022, 10 pages.

Minoli et al., "Case Study of an Implementation and Rollout of a High-Density High-Impact Network," Wiley, 2021, 21 pages.

* cited by examiner

600

| Technology Segment (maximally integrated by networking, operations, administration) | Services | Utilizations |
|---|---|---|
| DAS | For all major U.S. wireless service providers | 4G LTE, migratable to 5G |
| Broadband | Internet, VoWi-Fi/VoIP, entertainment OTT | High-Density High throughput Wi-Fi 5 (802.11ac Wave 2) and seamlessly migratable to Wi-Fi 6 (802.11ax) |
| Private Wi-Fi | Kiosks, mobile apps, LTE Roaming | - Enables Smart Restrooms operations including custodian location tracking, and custodian dispatching, consumables resupply, and restroom cleaning when usage thresholds are met<br>- Supplements connectivity gaps in DAS coverage<br>- Provides lower-cost connectivity for kiosks and information/advertising displays |
| BLE | Wayfinding, Proximity, Indoor tracking | - Enables Concession proximity marketing<br>- Enables Operator asset tracking such as luggage carts and wheelchairs |
| CBRS/LTE (Private LTE via CBRS) | Kiosks, Mobile Apps, Outdoor tracking | - Enables Smart Restroom connectivity, which includes people counting, stall occupancy detection<br>- Enables Airport Operations including baggage scanning, airplane flight preparation and maintenance, airport vehicle location tracking and maintenance<br>- Supplements connectivity gaps in Wi-Fi coverage |
| IoT/LoRaWAN | Sensors, Lighting, building management (all airport buildings) management, campus management, environment management | Indoor technology complemented by LoRa WAN Gateways<br>- enables low bandwidth wide-area sensor data collection<br>- include Smart Restrooms, consumables monitoring, plumbing leak detection, temperature, humidity, and air quality monitoring |
| Mobile APP Management | Tablet, phones, laptops, watches, wearables | Support design, development and deployment wireless integrations for beacon integration, map/ directory synchronization, proximity messaging, blue dot wayfinding and asset tracking |

Public Mobile Device Services

INTERNET - PORTAL ADVERTISING - LIVE TV - WAYFINDING - PROXIMITY MARKETING

Smart Restrooms

MOBILE APP MANAGEMENT - PROXIMITY DETECTION - PEOPLE COUNTING - CONSUMABLES SENSORS - OCCUPANCY DETECTION - PLUMBING LEAK DETECTION - AIR QUALITY MONITORING - FEEDBACK TABLETS

Building Maintenance Operations

PLUMBING LEAK DETECTION - AIR QUALITY MONITORING

Retail Concessions

INTERNET - VOIP - TV

Mall Operator Services

SERVICE DIRECTORY MAINTENANCE - WAYFINDING MAP INTEGRATION FOR WEBSITE/KIOSK/APP - POS TABLET CONNECTIVITY - PASSENGER FLOW MONITORING/REPORTING

Delivery Services Operators

MOBILE SCANNER CONNECTIVITY - CART TRACKING

Enterprise Business Offices

BROADBAND - VPN - NETWORKING

Vending/ATM Providers

FIXED DEVICE CONNECTIVITY/MONITORING

Advertising Network Operators

KIOSK CONNECTIVITY - VIDEO DISPLAY NETWORKING - VIEWER DEMOGRAPHIC DATA COLLECTION/REPORTING

Robot Operations

ROBOT CONNECTIVITY / POWER MONITORING - GEO-FENCING - WAYFINDING

Rental Service Operators

ASSET TRACKING

Mobile App Projects

BEACON INTEGRATION - BLUEDOT WAYFINDING, ASSET TRACKING, PROXIMITY MESSAGING, MAP/DIRECTORY SYNCHRONIZATION - APPS, KIOSKS, WEBSITES, GOOGLE/APPLE MAPS

Airplane Maintenance Contractors

VEHICLE SAFETY/MILEAGE MONITORING - TOW TRACTOR LOCATION TRACKING

Baggage Handling

MOBILE SCANNER CONNECTIVITY

FIG. 7

WIRELESS SUPERNETWORK FOR DENSE ENVIRONMENTS

CROSS REFERENCE TO RELATED APPLICATION

This application claims the benefit of U.S. Provisional Application No. 63/143,572, filed Jan. 29, 2021, which is hereby incorporated in its entirety.

TECHNICAL FIELD

The present invention pertains generally to communications networks, more particularly to communications networks having a wireless component, and yet more particularly to a communications network for integrating input data from a plurality of service providers and providing a super-integrated management system to multiple categories of user, and particularly to a dense user and/or technology environment.

BACKGROUND OF THE INVENTION

There are many technical building blocks of a modern network delivered by many solutions and many points of view. There is often an end-user expectation for a transparent, easy-to-use, service-oriented, multimedia-based, customizable, secure network that transcends locality and navigates along wherever the user is, sojourns, or transits. There exists a need for an efficiently integrated, cohesive technical-, service-, and administrative-platform to meet the needs of users. In 2020 the wireless network ecosystem was already valued in tens of trillions with wireless networks at $3 trillion, and is expected to reach $4 trillion by 2023 (that equates to an intrinsic value of more than $500 for every human being on the planet), IoT (internet of things) at $1 trillion in 2020 growing to $5.5 trillion to 12.6 Trillion By 2030, CBRS (Citizen's Band Radio Services) is estimated to grow to $1 billion, the Bluetooth market to $16.5 billion by 2026, and many other wireless networks following similar trends. The mobile internet is becoming an economic human necessity on par with electricity and clean water: according to Cisco's annual internet report, 66% of the world's population will be using the Internet by 2023; over 70% of this Internet access connectivity will be over a wireless network.

During the past 50 years, the industry has seen major advancements in Information Technology (IT). Fifty years ago, the world was still mostly analog, voice-based, low-bandwidth, hardware-enslaved, monopolistic, and carrier-dominated. A transition to a digital world took off, never to stop, in the 1970s as digital switches and fiber optic started to make their presence. Data networks, first based on dedicated links, started to become more broadly available in the 1980s, although generally expensive. The Internet Protocol (IP) was born early in the decade. Local Area Networks (LANs) were standardized and timidly deployed also in the 1980s as were first generation wireless cellular services.

Then came the Internet and the standardization of the World Wide Web (WWW), with major rollouts starting in the early 1990s. IP won out over other competitors and became the de facto standards for data transmission in the LAN, in the Wide Area Network (WAN), and the Internet. And, also came newer video encoding schemes, such as Moving Picture Expert Group (MPEG) standards that leap-frogged the earlier "CCITT—Consultative Committee for International Telephony and Telegraphy" (now ITU) schemes.

Packetization of voice had its modest beginning in the 1970s, although voice compression, also known as vocoding, was as foreign to carriers as the term vocoding, defining the science, sounds. The 1990s saw the beginning of the deployment of Voice over IP (VoIP), especially as the Session Initiation Protocol (SIP) came of age at the end of that decade.

Major advances in semiconductor technology, following Moore's Law, continued furiously through the five decades referenced above, continuing to the present, making digital signal processing for voice, video, and other applications practical and cost effective, and also supporting a migration to second-, third-, fourth-, and fifth-generation cellular. The Internet of Things (IoT) concept took form, systematizing earlier disjoined disciplines, with the goal of embedding intelligence into every imaginable object used in modern life.

While Wireless Local Area Networks (WLANs) saw near ubiquitous deployment in companies' intranet, Wi-Fi also started to be deployed in public hotspots and people's homes in the 2000s. At the same time—while the previous core network technologies migrated away from private lines and even from the Asynchronous Transfer Mode view to an all-IP based system at Layer 3 (possibly under a MultiProtocol Label Switching paradigm)—Ethernet-based WAN core services started to make their presence in the carrier's world, including in Cable TV and Internet access networks, offering an advanced mechanism either as a replacement of Synchronous Optical Network/Optical Transport Network (SONET/OTN), or at least as a Layer 2 vehicle running on and/or 'managing' the SONET physical network.

So, by the 2010s the voice world became effectively IP-based, video (such as IP Television ['PTV]) and streaming became IP-based, the Internet IP-based and the IoT is all IoT-based. People say that we "used to design and deploy voice networks and struggled to make them carry data—now we design and deploy data networks and struggle (in a manner of speech) to make them carry voice".

The sum total of this retrospective is that a major migration to IP-for-all-services has taken hold and VoIP and packet-based video are king. What comes next?

The lessons from VoIP need to be appreciated and projected forward: gone are the days where specialized, closed, vendor-specific hardware provided a fixed, inflexible, slow-to-enhancements, uni-threaded, undifferentiated, integrated service. If a user needed some additional service, a different overlay network had to be provided. IP has taken over, and VoIP and Over The Top (OTT) are powerful integrative technologies. But now wireless technology networks, such as Wi-Fi, will extend that progression to the delivery layer, making the service homogenous, ubiquitous, economical, dynamic, and quickly upgradable. Wireless networks will be the last mile. Carriers will need to adapt and adopt wireless networks as the last mile or see severe diminutions in revenues. There will be applications for 5G, particularly for people in transit, on highways, or in remote open areas (say, at the beach or while enjoying a fishing outing on a boat close to the shore), and for dispersed sensors that might make use of NB-IoT (or successors), but to achieve true high bandwidth mmWave frequencies may be needed, however, these frequencies have transmission limitations. Some services will emerge at the new sub-6 MHz bands, but they will remain relatively expensive, will be tethered to a given carrier, and be at low bandwidth by current standards.

At the same time, as mobile networks become more complex, cloud and Artificial Intelligence (AI) technologies are becoming more important in moving the management of these networks from one of managing network elements to one of managing the end-to-end user experience. Wireless networks of the future and the teams that manage them will need AI 'network assistants' on their team to help.

Traditional "high-density" networks typically entail a multitude of independent networks not working together within one environment; almost invariably there is no sharing of infrastructure or revenue (by revenue arrangements). Typically, in an airport each provider simply built, installed and operated their own network. Further, anyone was able to install their own 'rogue' wireless requirements, like Access Points (APs). Some operators charged their customers for network access while still others offered 'free' wireless access but usually with a side condition (such as becoming a subscriber to their network). Thus, one finds a situation where independently-deployed or operated APs are turned up all the time. For example, someone who owns a store in the airport may buy an AP and then use it for their store operations or (worse) allows users have 'free' Wi-Fi as a small inducement to get customers in the door. When one thinks about this kind of setup from the perspective of the customer (passenger in an airport) and from the perspective of the airport this approach is less than optimal. The airport is tasked with dealing with the consequences of the multitude of wired and wireless networks such as construction, permitting, tangled signals, and lack of network transparency, and the user had to take what was given.

Prior art documents several partial technical solutions, but these are often deployed as standalone systems. In some cases, the use of multiple solutions from multiple providers is useful, practical, even inevitable; such an approach, however, requires the separate administration, engineering, provisioning, operations, managing, sparing, vendor-stewardship, and billing of the various systems and service providers. The movement toward an integrated solution that is consistent both at the technology level as well at the administration level (including engineering, provisioning, operations, managing, sparing, vendor-stewardship, and billing) is both achievable and desirable. While 5G solutions may bring a degree of conversion at the wide area level, it does not bring self-service to the user. It is likely that bona fide LAN technologies (such as 802.11ax) will continue to serve the needs of institutions at the local level for the foreseeable future, possibly forever. A major advancement toward integrated solutions took place when a large number of siloed technologies, including voice, entertainment video, OTT-video, OTT-voice, videoconferencing, video security, situational awareness, and all web-based activity has migrated to TCP/IP.

In settings that have lagged behind in the implementation of wireless network systems, challenges such as technology cost, cybersecurity, interoperability, organizational challenges, and installation have resulted all too often in slow and/or incomplete adoption. Another example is the factory environment, where an estimated 70 percent of manufacturers have been unable to scale beyond pilots. Interoperability is crucial to achieving maximum impact for wireless technologies. The current technology stacks are fragmented and siloed, with many walled garden, proprietary systems. Solving this issue is critical for the wireless networks to reach their maximum potential.

BRIEF SUMMARY OF THE EMBODIMENTS

A wireless supernetwork (WiSNET), or a superintegrated network, as presented herein allows multiple network technologies to plug and play into one open wired and wireless network serving not only environments like large venues, parks, downtown areas, stadiums, public transit but also corporate, educational, health, institutional intranets in sprawling buildings or campuses. Instead of a multitude of overlay networks using a multitude of protocols, a disjoint operational support infrastructure, and a set of fragmented cybersecurity mechanisms (if even present), the opportunity embodiments of a WiSNET are based on an open network platform and can afford a "service disruption" in the sense of revamping the revenue model. In embodiments, the network makes pervasive use of wireless network technology as the local access and distribution apparatus for the so-called 'last quarter mile'. It should be noted that while the wireless equipment revenue has been growing in the U.S. in recent years at around 10% a year, the service revenues have remained relatively stagnant. A WiSNET architecture can bring down the cost and speed of implementation by eliminating traditional red tape (i.e., engineering, permitting and installation).

It has become a challenge for any large densely populated venue, park, downtown, campus, etc. to manage their wireless networks, namely DAS (cellular), internet and Wi-Fi. The wireless infrastructure in the environment has been a hodge-podge of different vendors installing various networks of routers and access points and software to serve their own interests. Each wireless carrier simply goes in and works out their own arrangement installing internet, Wi-Fi and cellular Distributed Antenna Systems/5G (DAS) to their advantage with in some cases poor end-user results. Even concessions put up Access Points and announce free Wi-Fi for customers who come into their store feeding into more wireless confusion. Over the past few years, it has become problematic for the owner dealing with a staggering of thousands of rogue networks winding around each other, for example: up to thousands of independent, multi-vendor networks operate within one environment; lack of service provider transparency and oversight; lack of transparency in equipment, services and processes; venue owners often not receiving any or truly little deserved revenue; network confusion and lack of management.

As a result, it represents a ripe opportunity for a digital transformation for densely populated environments. The challenge for the venue is how to get on top of the situation so that a unified service offering could be provided that would make it easy for those users in the environment to not have to think about using wireless services. Rather, they could simply choose the network supplied by the environment and plug in their technology software or open their mobile device connect to the wireless network infrastructure and the user dictates its experience not the vendor supplying the wireless technology.

WiSNET manages high density traffic environments in which true digital transformation can happen. What previously had been a difficult and disjointed operation (created by traditional mostly by carriers and bandwidth providers) is a now simple, clean focused platform opening up to a world of possibilities of how users can interact. Once an environment agrees to making the shift to WiSNET, the WiSNET will make the wireless and wired network environment part of the sharing economy.

WiSNET is designed to garner the benefits of what users want which is aligned with more affordability, convenience and efficiency. Such a design allows the redirection of independently deployed technologies like internet and Virtual Private Networks. These networks currently do not bring the value of the user connection into the hands of operators and give the opportunity to connect their users in a way they never have with their newfound "plug and play for pay" possibilities. WiSNET turns environments revenue-dormant wireless networks into an alive, highly active unified smart gateway engineered superintegrated network to generate and extract revenue through captive portals, interstitial redirection (tracking and targeting ads), and uplink control (pay tier services); among other built-in platform functions all controlled by a single central policy engine. This allows the network manager to "slice" up the bandwidth, controlling access to both wired and wireless networks with per user, per group, or per network traffic shaping and dynamic VLAN assignment providing maximum security and auditing. Not only can you slice bandwidth into multiple networks, but you can do so down to the individual device to further offer enhanced experiences and limit data breaches at the user level with WiSNet. WiSNET is able to quickly enable an enhanced response capability to deliver individual and customized, feature-rich control within a branded portal with advanced data, revenue generation and location tracking.

Another benefit of WiSNET technology is that it is agnostic. It allows multiple products and services to be mixed and configured as required delivering the most technically sound and safe wireless available on the market. A WiSNET can mix and match technologies and include a way for the client to profit from the wireless networks including IoT, Bluetooth, CBRS, UltraWideband, LoraWAN, LTE and more.

WiSNET has completely turned the architecture and business model on its end such that the owner is in complete transparent control of what happens. Instead of allowing the network vendors access to operate independently, now they are all cooperating and running in a harmonious manner with each network available for other users, concessions and vendors to plug into. It used to be that the venue operator thought of the wireless network as a cost center. Now, the wireless assets are a major source of revenue and asset value for the venue owner.

Embodiments of a WiSNET discussed herein may include any or all of the following features: a management system including access control, security, reporting, and/or tracking; wireless technologies such as Bluetooth, WiFi, DAS/5G, IoT, and others; an end-user portal which allows self-provisioning, device and subscription management, moves, adds, and changes; and a delivery system including content management, security, traffic control, and authentication.

Interface and Access Capabilities of WiSNET

WiSNET is an intelligent integrated network that allows independent users, software and hardware to meet and act on or communicate with each other over well-defined standardized interfaces. Sample use cases include Traditional Core interfaces—dumb or intelligent core networks (PSTN, VoIP networks, cellular, Internet, video networks, content networks, SaaS clouds, and IoT networks) can interconnect to the WiSNET over defined backbone interfaces utilizing infrastructure such, fiber, copper, VPNs, wireless, or satellite last mile.

Multi-domain (interrelated) WiSNETs, where different technologies and/or administrative purviews and/or functions and/or scopes and/or proximity are present.

WiSNET to WiSNET—Multiple (remote from one another) WiSNET can create a wide area network when interconnected together (using dumb or intelligent core networks), thus creating the ability to share resources and users.

Regarding access, users can be inside the domain of a WiSNET, or can be outside the domain; in either case proper identification and authentication may be required to gain access. In particular, a user may not have to be internal to the local area WiSNET network to gain access to the services or the users of the WiSNET; such a "guest" user can be located outside the WiSNET but be granted permission to utilize the services and benefits of the WiSNET architecture including users, software and applications.

A WiSNET is a superintegrated service-rich INET institutional (corporate/campus) network (INET). INETs may cover (i) voice services in the form of VoIP, VoWi-Fi, distributed antenna systems (DASs), and private (virtual) cellular networks (in addition to the public cellular networks edging toward 5G); (ii) extreme reliance of Wi-Fi access in the form of Wi-Fi 6 and also new usable bands; (iii) Virtual Private Networks as the wide-area connectivity of choice; (iv) integration of Building Management Systems (BMS) to support smart building/smart campus functionality along with RTLS and more general IoT functionality; (v) cloud-based services and analytics, also based on the concepts of Software Defined Networks (SDNs) and Network Function Virtualization (NFV); (vi) massive use of videoconferencing as well as (corporate reception where/as needed) of OTT/IPTV video feeds (e.g., business TV); and the widespread use of Artificial Intelligence (AI), Machine Learning (ML) and Deep Learning (DL).

A WiSNET is a superintegrated service-rich INET network where the preponderance of the local and edge connectivity is wireless; such a WiSNET, in addition to the underlying technologies just cited, utilizes a unified, highly flexible, cost-effective management and administration apparatus.

According to one or more embodiments, a wireless communications network for integrating input data from a plurality of service providers includes:

a service delivery system comprising one or more network interfaces, each of the one or more network interfaces in communication with at least one of the plurality of service providers;

wherein the service delivery system is configured to communicate with two or more service providers selected from the group consisting of: a wireless service provider, an internet service provider, a software as a service provider, an internet of things analytics service provider, and a content provider;

a data aggregation system comprising a plurality of network gateways, the data aggregation system configured to receive input data, via the service delivery system, from each of the plurality of service providers, the data aggregation system further configured to provide aggregated input data;

a local delivery system comprising a plurality of access points, the local delivery system configured to receive the aggregated input data from data aggregation system and transmit at least a portion of the aggregated input data to multiple categories of user via a superintegrated access platform; and a superintegrated management system comprising a processing system including a processor, the superintegrated management system in communication with the data aggregation system and the local delivery system, the superintegrated management system configured to assign a network slice to each of a plurality of user profiles, and further configured to report network property data to each of the multiple categories of user.

According to one or more embodiments, the local delivery system is configured to transmit the at least a portion of the aggregated input data using a wireless communication protocol.

According to one or more embodiments, the local delivery system is configured to transmit the aggregated input data using a wireless communication protocol belonging to an IEEE 802 family of standards.

According to one or more embodiments, the multiple categories of user include a first user having access to view network property data relating to both the service delivery system and the local delivery system; a second user having access to configure at least one of a network slice and a service slice and to view network property data relating to the local delivery system; and a third user having access to communicate with local delivery system.

According to one or more embodiments, at least one of the multiple categories of user has access, through the superintegrated access platform, to configure the network slice assigned by the superintegrated management system.

According to one or more embodiments, the network has a network architecture including four or more architectural features selected from the group consisting of: a unified architecture; an open, integrated, unified platform and access technology; an internet protocol centric protocol suite; a consistent core technology; a unified administration; a secure communications environment; providing support for two or more disparate communications services; providing services which are extensible and tailorable; and an ecosystem supporting internet of things; 99.99% end to end service availability.

According to one or more embodiments, the network includes support for four or more technology features selected from the group consisting of: voice-related services; data-related services; wide area network related services; building management related services; cloud-supported services; video related services; and artificial intelligence related services.

According to one or more embodiments, the network includes a performance monitoring system configured to monitor performance of the entire network including at least hardware status diagnosis, traffic monitoring, and network overload detection.

According to one or more embodiments, the performance monitoring system is configured to rebalance network traffic between a plurality of nodes of the local delivery system.

According to one or more embodiments, the performance monitoring system is configured to provide a network performance data visualization.

According to one or more embodiments, the local delivery system is configured to perform address management across the superintegrated access platform.

According to one or more embodiments, the local delivery system is configured to provide adjustable data traffic parameters.

According to one or more embodiments, the network includes a service creation interface configured to provide a front-end user service interface and a back-end user service interface.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the wireless supernetwork are described with reference to the following figures, wherein like reference numerals refer to like parts throughout the various views unless otherwise specified.

FIG. 6 illustrates services which may be implemented in an embodiment of a WiSNET for an airport.

FIG. 7 illustrates applications and functions available to users of an embodiment of a WiSNET for an airport.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

DETAILED DESCRIPTION OF THE INVENTION

Figure 1:
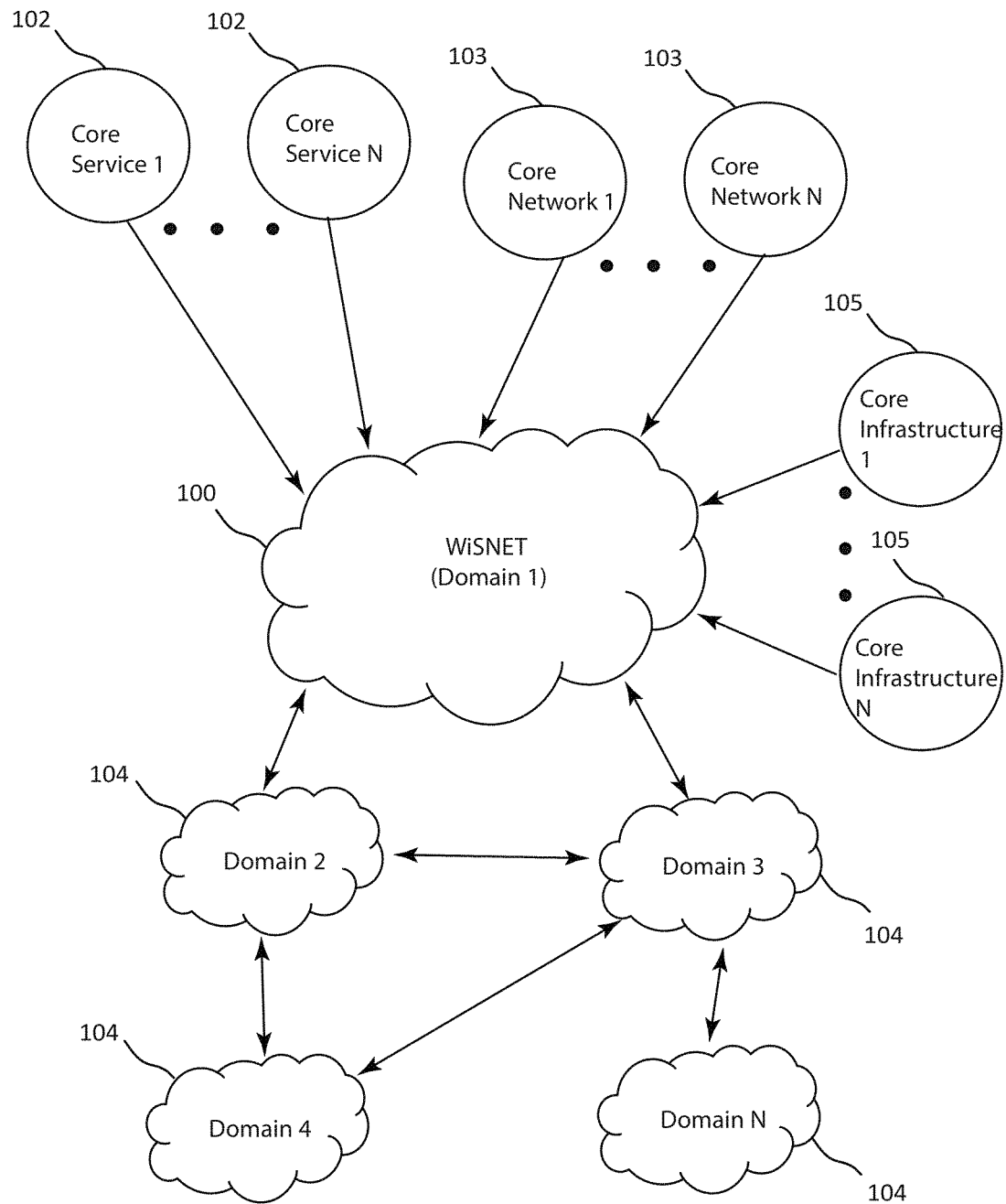
FIG. 1 is an example illustration of a hierarchical logical architecture model of communication interfaces with a WiSNET in accordance with one or more embodiments.

Referring initially to FIG. 1, a hierarchical logical architecture model of a WiSNET is depicted. In particular, there are illustrated example communication interfaces with a WiSNET in accordance with one or more embodiments. WiSNET 100 is shown in communication with one or more core services 102 (e.g., core service 1 through core service N); one or more core networks 103 (e.g., core network 1 through core network N); and one or more core infrastructures 105 (e.g., core infrastructure 1 through core infrastructure N). Core services, networks, and/or interfaces may be dumb or intelligent core networks (PSTN, VoIP networks, cellular, internet, video networks, content networks, SaaS clouds, and IoT networks, etc.). The core elements, 102, 103, 105 can interconnect to the WiSNET over defined backbone interfaces utilizing infrastructure such as, copper, fiber-optic, VPNs, wireless, or satellite last mile. WiSNET 100 may interface with numerous disparate types of core elements, multiple core elements of the same type, or both. Various embodiments of WiSNET 100 may interface with any or all of core services 102, core networks 103, and core infrastructures 105.

The WiSNET 100 may interconnect with other networks that operate in different domains 104 (domains as used herein may refer to any of administrative domains, technological domains, architectural domains, and others). Interconnection of disparate domains through the WiSNET creates the ability to share resources and users across networks. For example, any of domains 104 (e.g. domain 2, 3, 4, or N) may be a private VLAN, a VPN, a discrete network slice, or a discrete service slice. In some cases, a domain 104 may be directly linked to WiSNET 100 (e.g. domains 2 and 3). In other cases, a domain 104 may be indirectly linked to WiSNET 100 by virtue of a connection with a directly linked domain (e.g. domain 4 may be considered directly linked with WiSNET 100 by its connection with domain(s) 2 or 3). In some cases multiple WiSNETs may be directly connected to one another in a similar manner.

As used in this application, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

Figure 2:
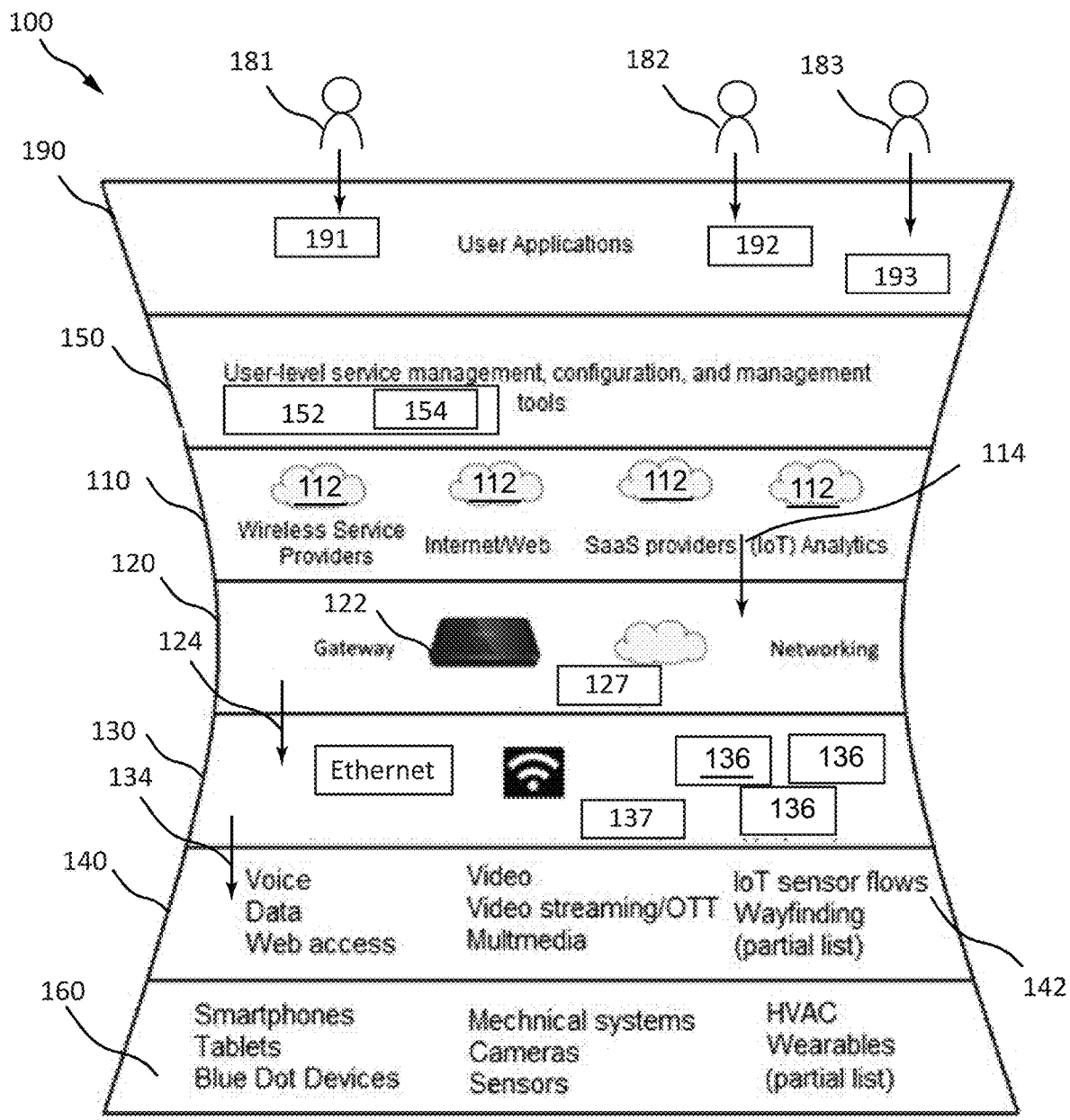
FIG. 2 is an example illustration of an embodiment of a WiSNET architecture.
Figure 3:
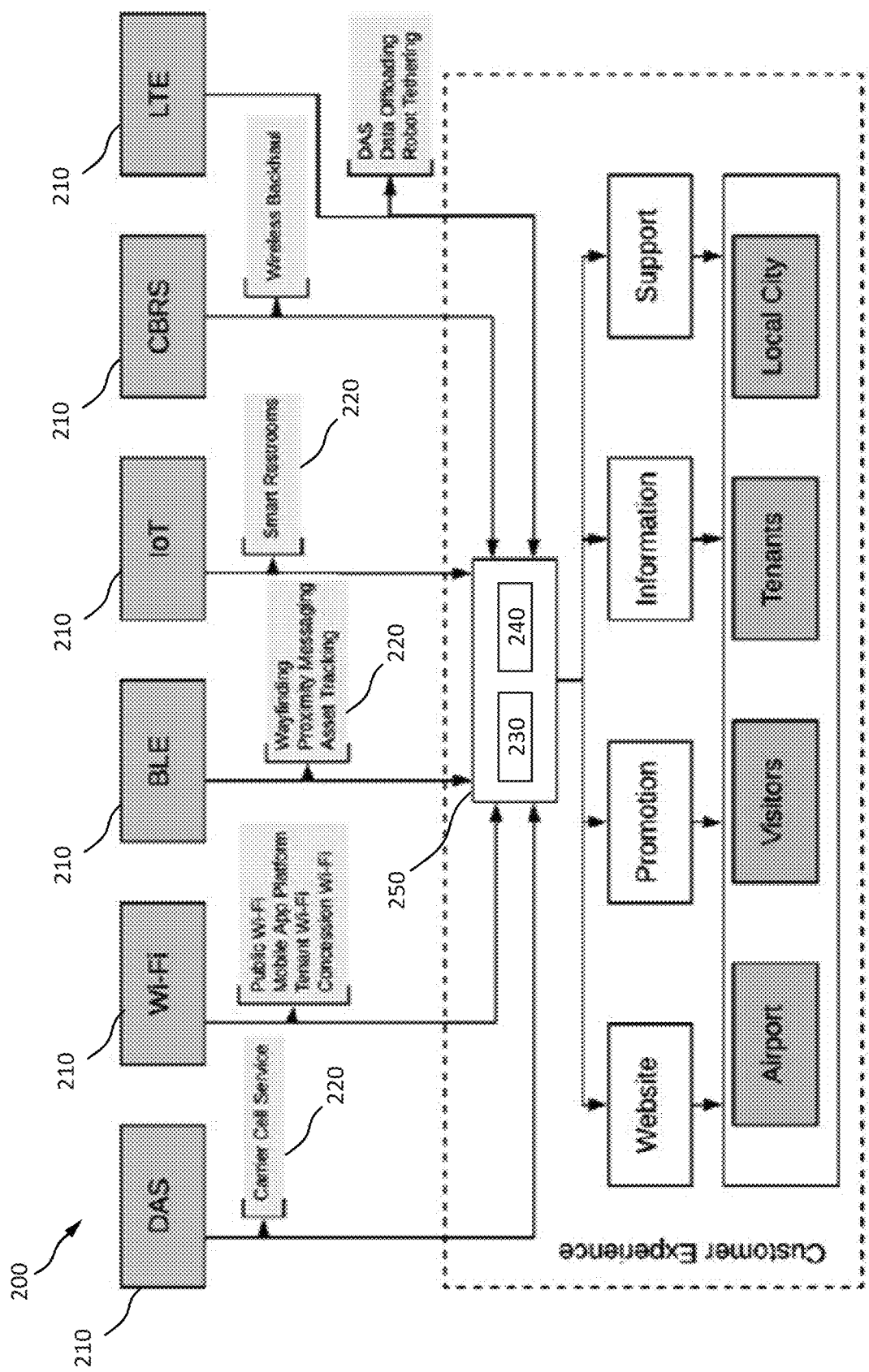
FIG. 3 is an exemplary block diagram of an embodiment of a WiSNET, illustrating architectural, technological, and management features.
Figure 4:
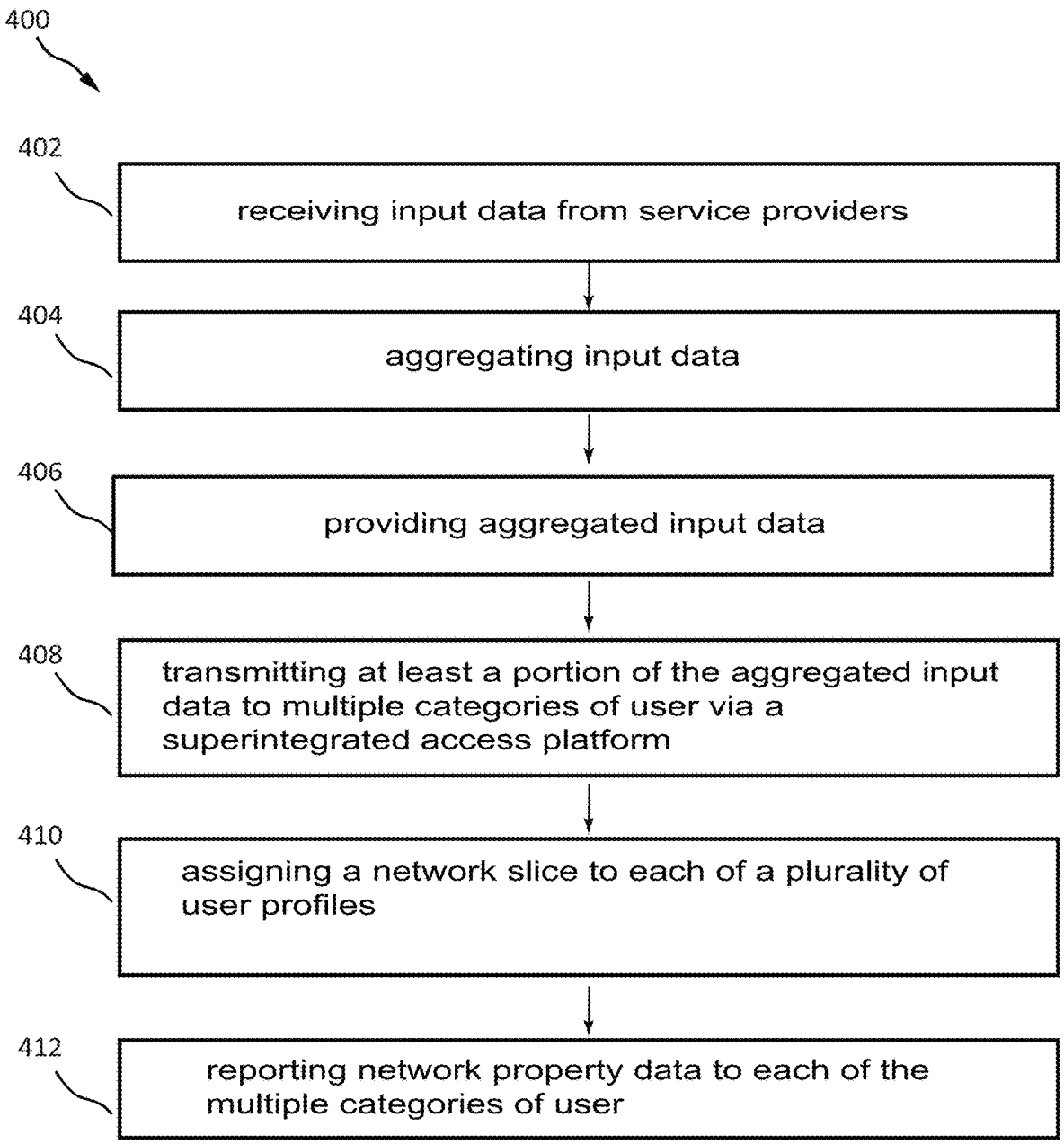
FIG. 4 is a flowchart illustrating a method of providing wireless data communication.

FIG. 2 is an example of an embodiment of a hierarchical logical architecture of a wireless supernetwork generally designated as 100, also referred to herein as a WiSNET. FIG. 3 is an exemplary block diagram of an embodiment of a WiSNET 100. Embodiments of a WiSNET support dense environments, such as high-density settings, medium density settings, or large public or private venues, such as for example, an airport, a stadium, or a convention center, a casino, a megachurch, as well as other environments. Embodiments of the WiSNET may span one or multiple domains, where distinct domains may be differentiated by having distinct or disparate administration, technology, or architecture.

WiSNET 100 includes a service delivery system 110 which is in communication with one or more service providers 112. Service delivery system 110 may include the hardware, the software, or both, required to interface with service providers 112.

As used herein, the term "system" generally describes one or more hardware devices, computer code, or a combination thereof; an system may include one or more input devices for receiving data, one or more output devices for outputting data, a permanent memory for storing data, such as computer code, and a processor for executing computer code. The computer code resident in the permanent memory will physically cause the processor to read-in data via the input device, process the data within the processor, and output the processed data via the output device.

Service providers 112 include providers of different connectivity services, for example, wireless service providers (WSPs); internet service providers (ISPs); software as a service providers (SSPs or SaaSPs), which include application service providers (ASPs), cloud service providers (CSPs), and other providers of web-based software, hosted software, or on-demand software; internet of things analytics service providers (IASPs); content delivery network (CDN) providers; and video analytics/situational awareness (security/surveillance) providers. In embodiments, the service delivery system is configured to communicate with two or more service providers providing disparate connectivity services.

Each service provider 112 may provide input data 114 to service delivery system 110. Input data 114 may include, for example, information from one or more of the following types: voice; video; multimedia; graphical; web, textual, and/or application information; internet of things information flows; gaming information flows; virtual reality information flows; telemetry information flows; security analytics information flows; and local spatial positioning information flows.

A data aggregation system 120 is configured to receive input data 114 from service delivery system 110. Data aggregation system 120 may provide data processing, for example in support of data flow control or network policy control. Data aggregation system 120 may include one or more network gateways 122 (hardware or software), associated networking hardware, and other hardware 127, as shown in FIG. 2. Data aggregation system 120 may also or instead include hardware and/or software for data storage and distribution. Data aggregation system 120 is configured to provide aggregated input data 124, which may in some cases include all input data 114 or a portion of input data 114.

A local delivery system 130 is configured to receive aggregated input data 124 from data aggregation system 120. Local delivery system 130 includes a plurality of access points 136 (including Distributed Antenna Systems (DASs) antennas, Bluetooth/ZigBee/NFC/UWB/RFID sensing/transmit access nodes and others), which may include stand-alone wireless access points or access points integral to other system hardware (e.g., an access point 136 may be an integral component of a router of local delivery system 130). The plurality of access points 136 may all have the same or similar technology, or they may include multiple different technologies. Local delivery system may include other elements 137 not specifically referenced herein, including emerging or future technologies. Local delivery system 130 transmits at least a portion 134 of aggregated input data 124 to multiple categories of user, via a superintegrated access platform 140. Access platform 140 may be considered unified, in that it may present a comparable view to all categories of user, from a service-, functionality-, technology-management and usability perspective. For example, a Service Oriented Architecture (SOA) paradigm may be utilized.

As used herein, the term "superintegrated" refers to having combined, unified, integrated characteristics, especially when the number of individual and distinct technology constituents or sub-elements, or individual and distinct administrative constituents or sub-elements, or individual and distinct architectural constituents or sub-elements, is large, and/or when the individual and distinct constituents or sub-elements are multi-functional, multi-faceted, multi-factorial, and/or multi-domain.

"Super-integration" in a dense environment may include any or all of the following services (i) voice services in the form of VoIP, VoWi-Fi, DASs, and private (virtual) cellular networks (in addition to public cellular networks); (ii) extreme reliance of Wi-Fi access in the form of Wi-Fi 6 and also new usable bands; (iii) Virtual Private Networks (VPNs) as the wide-area connectivity of choice; (iv) integration of Building Management Systems (BMS) to support smart building/smart campus functionality along with RTLS and more general IoT functionality; (v) cloud-based services and analytics, also based on the concepts of Software Defined Networks (SDNs) and Network Function Virtualization (NFV); (vi) massive use of videoconferencing, as well as (corporate reception where/as needed) of OTT/IPTV video feeds (e.g., business TV); (vii) video analytics/situational awareness (security/surveillance); and (viii) the widespread use of AI, Machine Learning (ML), and Deep Learning (DL).

Access platform 140 may provide access to numerous services 142, and be able to accommodate emerging services and use cases. Services may encompass full multimedia applications, such as voice, video, data, text, streaming. Access platform 140 may support the evolving IoT/sensor-based applications including wayfinding and real-time location system (RTLS)-type services. The services may be extensible and tailorable, providing an elastic, dynamic environment.

Service Richness and Elasticity

The WiSNET may support all the services that have been identified for the 5G IoT as well as the other 5G services such as Ultra-Reliable And Low-Latency Communications (URLLC), massive MTC (mMTC), and enhanced Mobile Broadband (eMBB). It may be able to properly interface to the core networks (layer 5 of the above-cited RA) (which include 5G) to provide end-to-end support. 5G-type services discussed herein may refer to sub-6 MHz bands or to other, true high-bandwidth frequency bands, such as mmWave frequencies. A WiSNET by itself may not support mobile wide area networking, but it may support the panoply of evolving 5G-type services by proving local (campus) support of those services and properly handing off the IP flows to the core to achieve true global connectivity of all types. "Service richness" as used herein may refer to providing support for a number of disparate services, for example a service rich network may provide support for two, three, four, five, or more disparate communications services.

Local delivery system 130 may transmit data using a wireless communication protocol, for example, using Wi-Fi or being based on the IEEE 802.11 family of standards (e.g., Bluetooth Low Energy [BLE], Bluetooth Mesh, ZigBee, Wi-Fi HaLow) or based upon other protocols 136. In some aspects, local delivery system 130 may transmit data using wired technologies, such as Ethernet. In some cases, a combination of wired and wireless protocols may be used. In any of the mentioned configurations, a goal of the WiSNET is to deliver user access which is consistent to the maximum degree possible. The higher protocol stack may be IP/TCP/UDP with appropriate application-support upper layers. Administrator access may also be based on a unified suite such as SNMPv3, HTTP, SOAP, JSON, REST, XML, open APIs, and so on.

The WiSNET may include the concepts of a Service Oriented Architecture. (SOA) is an architectural style that supports service orientation. It may be applied to the field of software design, where services are provided to the other components by application components, through a communication protocol over a network. A service is a discrete unit of functionality that can be accessed remotely and acted upon and updated independently, such as retrieving a credit card statement online. SOA is also intended to be independent of vendors, products and technologies. Service orientation is a way of thinking in terms of services and service-based development and the outcomes of services. Service-oriented architecture integrates distributed, separately maintained and deployed software components.

Internet Protocol Centric Protocol Suite

Consistent with the unified RA introduced above and the open platform concept, the access discipline of a WiSNET may be Wi-Fi/IP centric. The core technology may also be IP-centric, where in the wired case (e.g., fiber-based with IP-over-SONET, IP-over-OTN, IP-over-DWDM, IP, MPLS), in the wireless case (e.g., IP-oriented 5G), or in the IoT/WSN case. This approach may apply not only to "user plane" but also in the "control plane" and in the "management plane". It may also be able to support IPv6, including MIPv6 where appropriate.

In some embodiments, there may be three, four, or more categories of user. A first user 181 may have access to view network property data relating to both the service delivery system 110 and the local delivery system 130. Examples of users in the category of first user include the owner or operator of a large venue, such as an airport, hospital, or university; a system administrator; a service provider 112; and others. An entity that manages the WiSNET may in some cases be a first user, and may in other scenarios be considered yet another type of user. A second user 182 may have access to configure at least one of a network slice or a service slice, and may have access to view network property data relating to the local delivery system 130. Examples of user in the category of second user 182 include an on-site retail concession, an on-site advertising concession, an off-site service vendor, and others. A third user 183 may have access to communicate with local delivery system 130. Examples of a third user 183 may be a traveler at an airport, a guest at a resort, or others. In all the above cases, a user may be one or more humans, or one or more devices or systems, such as a smartphone, a tablet, a sensor, a robot, or another input/output device. While the categories of first user 181, second user 182 and third user 183 have a minimum capability to interact with the network as described above, they may also have additional capabilities, access, or permissions. Other categories of user may also or instead by accommodated by the network. Some users may be categorized as more than one type of user described above.

A superintegrated management system 150 is in communication with data aggregation system 120 and local delivery system 130. Superintegrated management system 150 includes a processing system 152 having hardware (e.g., a processor 154) and software configured to deliver active administration of native and user services for infrastructure, applications, and security on the supernetwork. Superintegrated management system 150 may generally be used to support service configuration and tailoring. In one aspect, superintegrated management system 150 may be configured to assign a network slice or a service slice to each of a plurality of user profiles. Network slicing generally employs virtual networks created on top of a physical network by partitioning the physical network, where each partition (network slice) can be architected and optimized, e.g. for a user, application, or service. The network slice can be a self-contained network with its own virtual resources, topology, traffic flow, and provisioning rules. Conception, design, and implementation of E2E network slicing in 5G can expand over UEs, the access subnetwork, the transport subnetwork, and the core subnetwork. Network slices can have associated Service Level Agreement (SLA) commitments. For example, an example SLA commitment associated with a network slice can specify a total time for a 5G wireless communication system to deliver communication from the source to the destination. Another example SLA commitment associated with a network slice can specify reliability for delivering communication from the source to the destination. A network slice may have a set of resources and a network topology and certain administrator-specified properties, such as connectivity properties, speed properties, and capacity properties, to meet the needs of the specific user profile. In another aspect, network slicing provides a virtual networking architecture which allows for better network flexibility through partitioning of the wireless communication system into virtual elements.

A service slice is an aggregation of network slices with administrative, security, and functional elements to provide a transparent 'service in a suitcase', SOA-like, environment for defined end-to-end services (including provisioning, billing, monitoring, reporting, quality and usage management, profile management/storage, and so on.) Example configurations for a network slice or a service slice include: providing a discrete set of one or more addresses; providing a fixed or minimum amount of network bandwidth; providing access to a defined portion of one or more network resources, such as database(s); providing access to a limited domain, or a portion of a domain, within the network, e.g. a single facility on a campus. Service slicing can be used to provide solution slicing, for example, infrastructure slicing, networking slicing, platform slicing, combinations thereof, and others.

Superintegrated management system 150 may also be configured to report network property data to any or all of the multiple categories of user (181, 182, 183). Such network property data may include, for example, connectivity data, resource availability data, speed data, or capacity data. Network property data may pertain to a specific network resource, a group of network resources, or all connected network resources, depending on access permissions of the user category to which the data is being provided.

Superintegrated management system 150 may be accessible locally, (e.g. from within a venue supported by network 100), or remotely, (e.g., by an off-site user via a web interface, VPN, or similar). Each category of user 181, 182, 183 may be associated, respectively, with a user profile 191, 192, 193. The user profiles may be stored in a user application system 190 which may include a database. In addition, or instead, user application system 190 may be in communication with another system to receive information regarding the user profiles.

A plurality of devices or "things" 160, such as hand-held, wearable, stationary, and/or mechanical/process control devices, populate the universe of things used to deliver services to the user (which may be a human being or a mechanical/electrical system). Things 160 interface with superintegrated management system 150 which may provide data streams to and/or receive data streams from things 160.

FIG. 3 is an exemplary block diagram of an embodiment of a WiSNET 200, illustrating architectural, technological, and management features. WiSNET 200 may provide numerous different services 220, which may interface with different communication technologies 210. For example, WiSNET 200 may support voice-related technologies 210 such as, VoIP, voice over Wi-Fi (VoWi-Fi), DAS-based coverage for 4G and emerging 5G services, 5G network slicing, near-term private long term evolution (LTE), citizens broadband radio service (CBRS), service slicing technologies (for provisioning, administration, storage) and so on, and others. Appropriate backbone connectivity to the public switched telephone network (PSTN), to cellular networks, to the internet and/or to appropriate clouds, and related service support may be included. Examples of services 220 provided by communication technologies 210 include carrier cell service (e.g., provided by a service provider 112, see FIG. 2); wayfinding; proximity messaging; data offloading; wireless backhaul; and others, such as services 220 shown in FIG. 3. In embodiments, the WiSNET 200 may include support for four or more technology features selected from the group consisting of: voice-related services; data-related services; wide area network related services; building management related services; cloud-supported services; video related services; and artificial intelligence related services.

In embodiments, WiSNET 200 may support data-related technologies such as the following: traditional wired LANs for various baseline applications, including support of Power Over Ethernet (PoE); WLANs technologies, particularly IEEE 802.11ax; and/or support for new or evolving Wi-Fi bands, including the 60 GHz unlicensed band defined in IEEE standard 802.11ad, also known as WiGig. Appropriate backbone connectivity to the internet and/or to appropriate clouds, and related service support may be needed. Other technologies may be supported such as "LiFi", a wireless system that transmits data via LED or infrared light, or UWB technologies.

In embodiments, WiSNET 200 may support WAN-related services, such as Virtual Private Network (VPN) services, (e.g., for users to access corporate intranets). Appropriate backbone connectivity to the internet and/or to appropriate clouds, and related service support may be needed.

In embodiments, WiSNET 200 may support building management-related services. Campuses have requirements for mechanical support of systems. Although a Building Management System (BMS) may already be deployed at the campus, WiSNET may support—or at least interface to— BMS technology/functionality (in some instances replacing it). The WiSNET may support a large number of ancillary sensor networks whether IoT-based on non-IoT based (for example, but not limited to, for connected lighting). Various ancillary support for DeviceNet, SOAP, XML, BACnet, LonWorks and Modbus may be needed in some instances. Various RTLS technologies may be supported including Wi-Fi-, BLE-, ZigBee-, RFID (Radio Frequency Identification)-, and UWB (Ultra WideBand)-based systems. The plethora of IoT aggregations technologies may be supported including, for example, NarrowBand IoT (NB-IoT), 5G IoT, LoRa, and Sigfox.

In embodiments, WiSNET 200 may support cloud-supported services, such as by providing access to requisite cloud services, SaaS, and cloud analytics.

In embodiments, WiSNET 200 may support video-related services, such as video platforms and technologies and video-based web content. Appropriate bandwidth, latency, jitter, and packet loss service goals (requirements) may be supported by the underlying technologies and platforms, in order to deliver video content in a dense venue such as an airport, a stadium, or a convention center, to list a few. Technologies to support OTT and/or IPTV entertainment video that may be delivered over the WiSNET are needed.

Massive videoconferencing has become more prevalent in recent years (especially driven by the work/study at home paradigm shift engendered by the COVID-19 pandemic), spanning both the personal life as well as the business life of many. Technologies that support these services may be implemented by the WiSNET.

Security surveillance utilizing stationary IP cameras and more general (mobile) Situational Awareness capabilities (including, for, example face recognition) may be part of a WiSNET, including access to cloud-based analytics. Situational Awareness is the ability develop and deploy traditional or AI-based mechanisms to assess, recognize, anticipate, and intercept events specific to the use case of interest.

In embodiments, WiSNET 200 may support artificial-related services, such as artificial intelligence (AI)/machine learning (ML)/deep learning (DL) for various network-related or network-supported functions. A WiSNET may support and/or utilize these technologies.

ML predicts and classifies data using various algorithms optimized to the dataset in question. ML techniques are increasingly utilized to analyze, cluster, associate, classify, and apply regression methods to situational awareness data (as well as to many other IoT environments). Among other applications, ML techniques are applicable to image processing and analysis, computer vision, speech recognition and natural language understanding. One application of interest relates to correlation of network events for the purpose of more effective network management.

Communication technologies 210 may interface with a data aggregation system 230, a local delivery system 240, or both. Data aggregation system 230 and local delivery system 240 may be structured as described with reference to FIG. 2. This aspect of the WiSNET may be referred to as a unified architecture, in that a large number of underlying communication technologies 210 supporting a significant number of services 220 and different media, mixed-media, and multi-media communications, are functionally accessible through one interface 250 (e.g., interface 250 may include features and structural elements as described in relation to superintegrated management system 150).

There is value in describing a system architecture and ultimately standardizing a reference architecture (RA). Architectures simplify the characterization of the system's constituent functional blocks and the manner in which these functional blocks interrelate to each other. A RA facilitates the orderly partition of functions, typically in a hierarchical fashion. Such partition not only reduces functional redundancy and also promotes standardization with the possible definition of well-established layer-to-layer interfaces, while also allowing the intermingling of products from an open set of vendors' products with the goal of layer-function cost optimization and/or usage of Best-In-Class technology for each layer. A number of formal RAs have been defined for basic communications, for Internet of Thing (IoT) environments, and for application systems development, including the Open Systems Interconnection Reference Model (OSIRM) for communication; the Industrial Internet Reference Architecture (BRA), the Reference Architecture Model Industrie 4.0 (RAMI 4.0) and the ETSI High Level Architecture for M2M for the IoT ecosystem, among many other; and the Open Group Architecture Framework (TOGAF), the Zachman International model, and the U.S. Departure of Defense Architecture Framework (DoDAF), among many others for IT systems.

Open, Integrated, Unified Platform and Access Technology

Consistent with the unified architecture introduced above, interface 250 may be a software and/or hardware platform to deliver WiSNET services 220. Interface 250 may be open in terms of using industry standards for all elements of the platform, not only in the "user plane" but also in the "control plane" and in the "management plane". Interface 250 may also be open in the sense that vendors that conform to the reference architecture can offer a network element product (traditional, or conforming to software defined network/network function virtualization (SDN/NFV) design), that supports the operation of the platform. Interface 250 may also be open in the sense that any service provider (WSP, ISP, SSP, IASP, and so on) can contribute underlying services in a seamless manner (seamless in all three planes mentioned above). Interface 250 may be integrated from a service, functionality, technology management and usability perspective.

NFV allows service providers and carriers to rapidly define software-based network functions on commercial, off-the-shelf hardware. Utilizing these virtual network functions (VNFs) as the building blocks for creating virtual network services (VNSs), a WiSNET administrator can change the way the network services are provided. NFV engenders independence from proprietary equipment and single-vendor dependence.

Consistent Core Technology

Consistent with the unified RA introduced above and the open platform concept, the core networking technology used in the venue or setting, such as a campus area network (CAN), a metropolitan area network (MAN) or WAN, may in some embodiments include a subset of communication technologies that make IP the cornerstone of the protocol suite at the lower layers.

Unified Administration

Consistent with the unified RA introduced above, the administration of the network may be unified, namely similar (or in some cases identical) procedures to manage all classes of resources. Administration encompasses not only network management and monitoring functions to support the real-time delivery of services (more on this topic further below), but also, the service planning and provisioning interactions facing the service- and equipment-providers, as well as facing the ultimate user. This unified approach institutes discipline, simplicity, and quality assurance across all aspects of the WiSNET.

Secure Communications Environment

The WiSNET may support a high level of overall security. Cybersecurity includes at least the following requirements, which are requirements across the various services, environments, technologies, and management of the WiSNET ecosystem: Confidentiality (C)—making sure the data flows (be they voice, video, data, multimedia, sensor traffic, or management traffic) are not intercepted by unauthorized agents; Integrity (I)—making sure that information received over the WiSNET has not been altered; and, that the resident data has not been changed in an unauthorized manner; Availability (A)—making sure that the devices used by stakeholders (smartphones, laptops, tablets, sensors, network elements, and so on) are not incapacitated and/or placed in a state where they are not properly performing their function; or that the devices are not hijacked to become rough devices; or that analytics systems become flooded with spurious traffic; or that the communication channels or network elements are not intentionally jammed.

Ecosystem Supporting Internet of Things

An ecosystem which supports an internet of things, i.e., an IoT-empowered ecosystem, is discussed above with reference to "providing service richness and elasticity". Furthermore, it is desirable for the WiSNET to support some of the IoT-specific RAs, under the auspices of the overall RA cited above.

Service Availability

Service availability as discussed herein is quoted as the 'number of 9s' the service is up. For example, five (5) 9s means that the service is up 99.999% of the time. For example, a system that is up 99.99% of the time is down about 1 hour a year (0.87 hours to be exact).

WLANs are subject to various 'outages' due to interference from neighboring APs, or poor coverage, or inadequate backbone connectivity. The availability may also be related to the offered load: the higher the number of users (or the required throughput), the lower the actual availability as computed at the service level, not just at the system level. Although some WiSNET instantiations are directed to non-mission critical environments or applications, other instantiations may in fact support quasi-mission-critical or mission critical applications (particularly in the context of some IoT application such as surveillance or building/campus support of mechanical systems).

Availability is not per se an intrinsic architectural issue, although some aspects of it may entail architectural considerations (for example, the use of a dedicated frequency spectrum instead of a publicly-shared frequency spectrum). Availability can be seen as being related to the engineering and provisioning of a system—for example are redundant servers used, are redundant power supplied used, are redundant communication links used?

Availability can be defined end-to-end (including the service of the WAN providers), or it can be defined (measured) only over the local subnetwork. Naturally, it is desirable to have end-to-end availability, and the design can endeavor to achieve such end-to-end grade of service (for example, having redundant connectivity into the core, using reliable core service providers, having proactive/preventive monitoring of all elements of the network to anticipate or avoid outages). After all, what good is it if the local campus (e.g., airport) network is up, but connectivity to the internet or the cloud is severed? However, the end-to-end availability can never be greater that the availability of the local subnetwork; therefore, it is important to properly design and engineer that local component.

A WiSNET may be categorized as one of the following types of WiSNET based on service availability.
  WiSNET-4, may be designed and deployed such that all services enjoy a 99.99% end-to-end availability at expected traffic load;
  WiSNET-5, may be designed and deployed such that all services enjoy a 99.999% end-to-end availability at expected traffic load;
  WiSNET-6, may be designed and deployed such that all services enjoy a 99.9999% end-to-end availability at expected traffic load.
Simple Scalability The WiSNET may be easily scalable without requiring a major system or technology revamp or 'fork-lift' to enable it to support new users, new sections of the local campus, or new services.

In some embodiments, WiSNET 200 has a network architecture including four or more architectural features selected from the group consisting of: a unified architecture; an open, integrated, unified platform and access technology; an internet protocol centric protocol suite; a consistent core technology; a unified administration; a secure communications environment; providing support for two or more disparate communications services; an ecosystem supporting internet of things; 99.99% end to end service availability; and providing services which are extensible and tailorable.

WiSNET Administration

In this context administration refers to the real-time oversight of the WiSNET in order to maintain it in optimal, secure working order.

Fault management makes use technologies and procedures to detect, address, and document faults that could interfere with network operations. These fault management capabilities report and record problems that administrators can analyze for trends of various types. The use of AI/ML/DP has become prevalent in advanced monitoring tools.

Configuration management uses a set of technologies and procedures to configure and setup routers, firewalls, switches, servers, APs or other network devices. It offers tools to document the distribution and installation of new network element software release. It also can include tracking of any alterations to the configuration of the system by unauthorized agents.

Accounting management provides mechanisms to capture network utilization details; this can be part of usage-specific billing (although other types of billing may be instituted, at least for some services and/or some users).

Performance management provides mechanisms to monitor the status of the network in order to assure acceptable service levels. To support this function the need exists for gathering statistics on network service quality on a consistent basis. Typical metrics include link utilization, packet loss rates, and network response times, over all segments of the network and for all types of services.

The WiSNET endeavors to use industry standards for network management, clearly including the Simple Network Management Protocol RFC 3413 Version 3 (2002). Network Management capabilities embodied by the WiSNET include: (i) having administrative control over the entire local network; (ii) having the ability to provision devices connected to a network; (iii) having real-time logical/topological maps, along with the ability to discover new network connections.

Monitoring

Network Monitoring capabilities embodied by the WiSNET include: (i) the ability to constantly monitor the performance of an entire venue network; (ii) the ability to perform traffic management (monitoring the network and checking for the network overload); (iii) the ability to create a baseline for network performance metrics; (iv) the ability to alert administrators if the network crashes or varies from the baseline; (v) the ability to suggest solutions to performance issues when they arise; (vi) the ability to provide visualizations for network performance data; and, (vii) the ability for load balancing, given that traffic would be distributed evenly on the network. Particular network management services of interest in WiSNET include the following additional capabilities:
  Hardware diagnosis: capabilities to ascertain that all the hardware equipment is being monitored and in case of failure, the administrator is being notified.
  Hardware and software management: capabilities to automatically gather information about all hardware units in the network and about software installed.
  Data backup and restore: capabilities for automatic and scheduled storing a copy of configuration- and billing-data on backup servers and restoring information from them on demand.

In embodiments, the network may include a performance monitoring system (see, e.g., FIGS. 11-13) configured to monitor performance of the entire network, or portions thereof, including at least hardware status diagnosis, traffic monitoring, and network overload detection. In some cases, the performance monitoring system is configured to rebalance network traffic between a plurality of nodes of the local delivery system. The performance monitoring system may also, or instead, be configured to provide a network performance data visualization.

Provisioning

Provisioning deals with (i) adding a piece of equipment to the network and activating it; and/or (ii) updating network elements to bring a customer online, based on some service-specific set of parameters, possibly along with some parameters that the user himself/herself would enter as service tailoring process, this being service provisioning; (iii) defining a network or service slice for a user of the WiSNET services (e.g., the third user described above). Among other capabilities, this could entail address management: managing network addresses and ensuring that there are no address conflicts in the network. Other capabilities include: application service management; business-service management; and mobility management. In some embodiments, local delivery system 130 (see FIG. 2) is configured to perform address management across the superintegrated access platform (140).

Policy Enforcement

Users and other network entities typically need some kind of controlled throttling so that they do not monopolize the resources available to the detriment of other users. The WiSNET provides a number of tunable traffic/usage parameters to control the user behavior to a predefined "fair use". Other policy enforcement may be related to security and what the users can or cannot do when using the WiSNET. In some embodiments, local delivery system 130 (see FIG. 2) may be configured to provide adjustable data traffic parameters. Adjustable data traffic parameters may, for example, provide control (e.g., by the first user or the second user described above) of the user behavior (such as to meet a predefined "fair use" policy); restrict quantity or type of data delivery; prevent hoarding of network resources; prevent access to specific websites or network locations (e.g., attempting to reach inappropriate sites, using infected devices, or violating security policy or terms of use).

Security Assurance

Security management seeks to ascertain that network is being currently secured and to notify administrator in case of a breach; addressing security as part of managing a network was part of the original FCAPS management model. The main goal of network security management is to ensure that only authorized users and devices can access the network resources to which they have rights; unauthorized users or devices that are determined to have malware or some other malicious or harmful code are blocked. Functions that span security management cover network authentication, auditing, and authorization. A multilayered security process requires ongoing collection and a summary of critical information. A WiSNET will have rich virtual local area network (VLAN) and firewalling mechanisms to be utilized as appropriate. Some of the management functions include configuration and activation of network firewalls, intrusion detection systems, and VLANs; vulnerability management and unified threat management are also important. A roles-based function in security management software can also recognize if users may have access to specific resources based on their service options and service types.

Technology Vendor and Core Provider Management

As noted, the WiSNET makes use of a large number of technologies and service providers. The value of the WiSNET to the venue property owner is that the administrator of the network provides a single point of contact (SPOC) for the design, implementation, running, monitoring, and for expansion/scalability and technology refresh. The tools available under the WiSNET ecosystem potentiate an efficient and cost-effective capability to transparently manage all providers of network resources.

Service Definition

The tools available under the WiSNET ecosystem enable an effective service creation mechanism that allows the administrators to easily and rapidly introduce new or special-event services. This covers not only the service itself as visible to the end user, but the monitoring, the performance management, the security and the billability of such new service. In some embodiments, a WiSNET includes a service creation interface configured to provide a front-end user service interface and a back-end user service interface. The service creation interface may have a mechanism (e.g., an app or a web portal) that allows an administrator to easily and rapidly introduce new or special-event services. The front-end user service interface may present services to an end user, such as third user 183 (see FIG. 2). The back-end user service interface may provide configurable aspects, such as access to the monitoring, the performance management, the security and/or the billability of such new service. Access may be given to the creator of the service, the network administrator, and others.

Technology Evolution

New technology now comes along at a rapid rate. The new technology may provide new features, be more economical, or increase the set of users that can be supported in a given area. The WiSNET allows the administrators to easily introduce new technology and also transparently remove obsolete equipment and/or technology.

User Support and Control

It is often desirable to control or monitor users for a number of reasons, including for possible hoarding of network resources, for attempting to reach inappropriate sites, for (unwittingly) using infected devices, or for violating some security policy or terms of use. WiSNET allows the administrators to easily monitor and control all users.

Revenue Generation and Collection

A variety of service plans may be in place, particularly for different classes of services (e.g., video, voice, and so on). WiSNET enables rapid and reliable collection of usage fees. It simplifies revenue generation. All fees are collected by an administrative system operated by the network administrator. The venue provider is able to get the revenue share without having to set up complex mechanisms. All service providers are paid in an expeditious manner by an(other) administrative system operated by the network administrator.

A supernetwork described herein may generate revenue opportunities, such as by redirecting revenue previously paid to third-party companies and/or by facilitating expansion of services provided.

In terms of use, a first method 400 of providing wireless data communication by integrating input data 114 from a plurality of service providers 112 includes: (refer to FIGS. 1-4)

(a) receiving 402, by a service delivery system 110 comprising one or more network interfaces, input data from the plurality of service providers;
wherein the service delivery system is configured to communicate with two or more service providers selected from the group consisting of: a wireless service provider, an internet service provider, a software as a service provider, an internet of things analytics service provider, and a content provider;

(b) aggregating 404, by a data aggregation system 120 comprising a plurality of network gateways 122, the input data from each of the plurality of service providers;

(c) providing 406 aggregated input data 124, from the data aggregation system to a local delivery system 130, the local delivery system comprising a plurality of access points 136;

(d) transmitting 408, by the local delivery system, at least a portion of the aggregated input data to multiple categories of user via a superintegrated access platform 150; and (e) assigning 410, by a superintegrated management system 150 comprising a processing system including a processor, the superintegrated management system 150 in communication with the data aggregation system and the local delivery system, a network slice to each of a plurality of user profiles (191, 192, 193); and (f) reporting 412, by the superintegrated management system, network property data to each of the multiple categories of user (181, 182, 183).

The method may further include: providing four or more architectural features selected from the group consisting of: a unified architecture; an open, integrated, unified platform and access technology; an internet protocol centric protocol suite; a consistent core technology; a unified administration; a secure communications environment; an ecosystem supporting internet of things; and 99.99% end to end service availability.

Any of the preceding methods may further include: providing support for four or more technology features selected from the group consisting of: voice-related services; data-related services; wide area network related services; building management related services; cloud-supported services; video related services; and artificial intelligence related services.

Any of the preceding methods may further include: monitoring, by a performance monitoring system including a processor, performance of the entire network including at least hardware status diagnosis, traffic monitoring, and network overload detection. In embodiments, the method may further include: rebalancing network traffic between a plurality of nodes of the local delivery system, by the performance monitoring system.

Example I: WiSNET for an Airport

Figure 5:
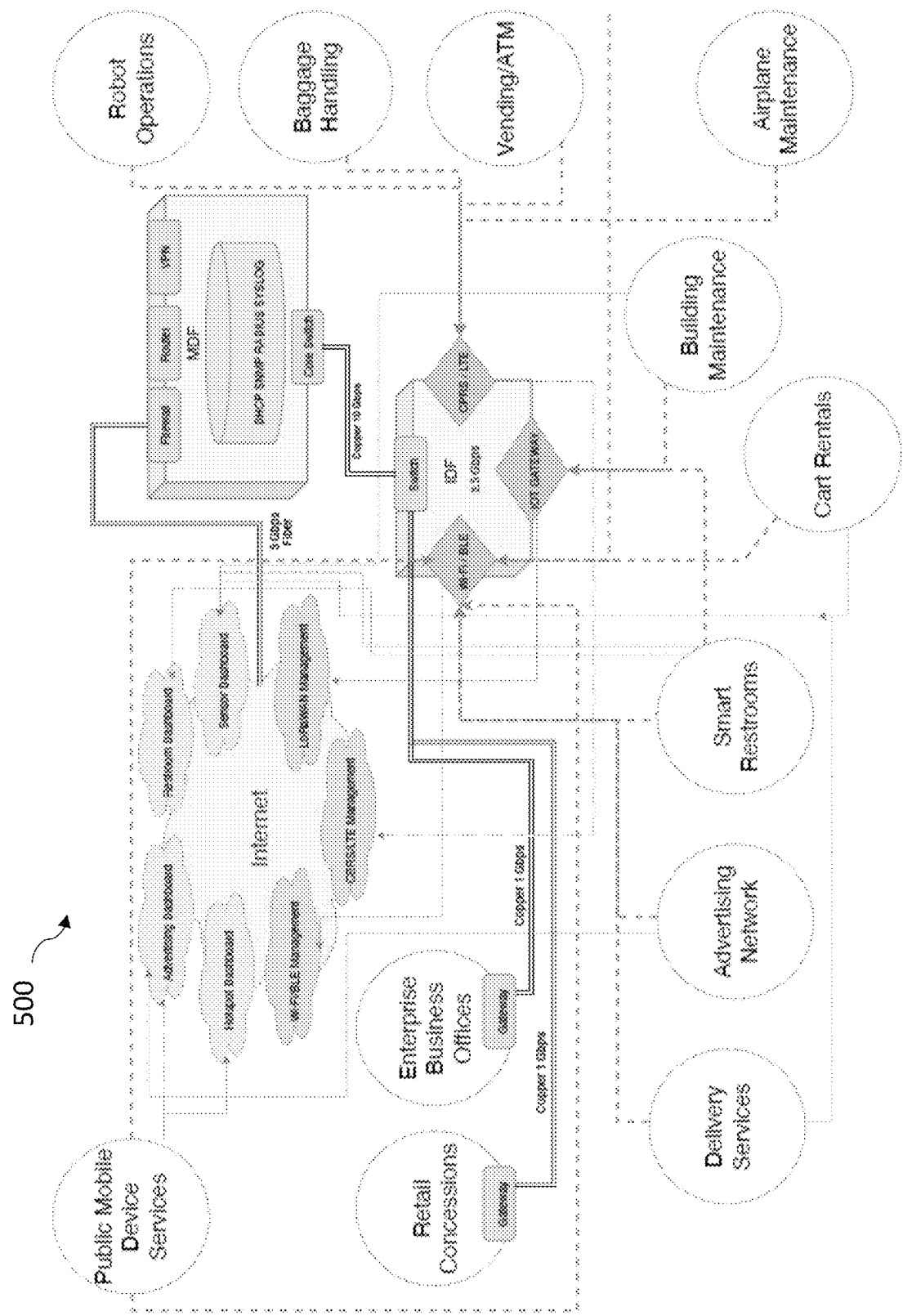
FIG. 5 depicts an exemplary WiSNET infrastructure, in an embodiment for an airport.

An exemplary embodiment of a WiSNET 500 deployment in an airport is given below, and discussed with reference to FIGS. 5-7. Features of the system include:

Carrier-neutral cellular service coverage across the entire airport footprint, including within public areas, rental car facilities, firehouse, and parking garages. Expanding the cellular and wireless coverage to the furthest corners of the airport campus enabled future smart city extensions with interconnected locations such as the train station, mall, convention center and bus terminals. Infrastructure upgrades may be included, such as a physical upgrade to a 5G-ready infrastructure.

Free, uninterrupted, and high-speed wireless for passengers to enjoy capable of exceeding today's demand for video chat, streaming and downloading, including access to entertainment services such as short films, premium movie channels, and local and regional content.

Indoor wayfinding and location-based messaging enabled via a network of Bluetooth Beacons that assists passengers navigating the airport, locating the nearest restrooms, and informing them of retail and food promotions as they pass by, including internal and external concierge delivery. Brands, businesses, and application developers interested in integrating with the network are supported. In particular, the wireless solution may be capable of being remotely updated, configured, and maintained with minimum or no service disruption.

The wireless system solution may interface with tenant existing systems (e.g., Ethernet networks, applications, and databases) and supports thousands of concurrent users with automatic RF Transmit Power Control (TPC), Configurable Acceptable Client Received Signal Strength Indicator (RSSI), Dynamic Frequency Selection (DFS), optimized AP roaming (load balancing), client mobility with seamless hand-off, Wireless QoS, and wireless security extensions including WPA2, AES, 802.11x EAP. The security solutions including wireless intrusion protection and malware detection systems meet industry standards for cybersecurity for public wireless systems and services, including: Wi-Fi Security Guidelines NISTSP800-153 and National Institute of Standards and Technology (NIST) framework for improving Critical Infrastructure Cybersecurity. The design provides an open access model that supports IP roaming across the entire Airport Terminal Building, jet bridges and ramp areas and provides proper placement with RF signals. The solution does not cause interference with existing communications or data systems. The wireless service may be free to some users, such as passengers, and provided for a fee to other users, such as airlines and concessionaires. Some specialty wireless and advertising services may be provided for a fee (e.g., push promotional content to users—advertisements, coupons, etc.).

Asset Tracking of physical resources, for example via Bluetooth sensor tags, helps to allocate airport resources, including employee monitoring, maintaining cleaner restrooms, locating luggage, passenger carts, and wheelchairs, reducing wait times, and increasing passenger comfort.

Future-ready technology that will also support AI-assisted autonomous vehicles and robotic utilization as those services become available.

Users of WiSNET 500 may include the airport operators (first user category); vendors that utilize the network to provide services to the venue (e.g., smart restrooms, maintenance, asset tracking, inventory, digital billboards) which may be in the second user category; concessions (another user in the second user category); and guests, such as airline passengers. Guests may interact with the WiSNET through services such as wireless data access, smart conveniences, and wayfinding.

FIG. 6 depicts an exemplary WiSNET infrastructure 600, in an embodiment for an airport. In embodiments, from a service perspective, supportive subsystems had to be designed, procured, installed, and activated, with an aim of having a maximally integrated panoply of technologies by way of common networking, operations, and administration.

FIG. 7 illustrates a set of services 700 which may be implemented in an embodiment of a WiSNET for an airport.

DAS Solutions

A neutral host DAS may be used to provide in-building coverage enhancement for cellular services inside the airport, hourly parking garage, and the rental car facility. The DAS solution may support frequencies used by national Wireless Service Providers (WSP). The solution may support all active technologies in the 700 MHz, 850 MHz, 1900 MHz (PCS), and 1700 MHz/2100 MHz (AWS), as well as future-use (e.g., 5G) frequency bands. The DAS head-end provides distribution of the carrier signal(s) that are connected over single-mode plenum-rated fiber between the head-end location and the distributed TRs. The neutral host DAS provides in-building coverage enhancement for the commercial wireless services. The solution meets the stringent requirements of the WSPs to ensure that the installed system will be approved to allow the legal rebroadcasting of their licensed spectrum. The DAS system supports multiple services (voice/data/video) in a modular architecture, so that services can be added or removed without disturbing existing services. The architecture enables a "pay as you grow" strategy for incrementally adding service-specific modules when new services are required. Methods of configuring a WiSNET include the design, installation, operation, and maintenance for the DAS.

The DAS solution consists of a DAS head-end that is flexible, modular, and scalable that can be expanded if needed in the future. In an embodiment, the DAS is designed to support 3 WSPs and 11 bands Day One with Coverage requirements of −85 dBm for CDMA over 95% and −95 dBm for LTE over 95%; RSCP with 8 dB dominance over the macro for 95% of the coverage area.

In an embodiment of a WiSNET, a High-Density High throughput Wi-Fi 5 (802.11ac Wave 2) may be installed, and may be seamlessly migratable to Wi-Fi 6 (802.11ax) or to other future standards. An existing Wi-Fi network may have physical service coverage gaps that may be filled when converting to a WiSNET. Major grade-of-service gaps may be present in terms of throughput, latency, and availability. The process to design, upgrade, and install the new Wi-Fi infrastructure may include the following steps (in addition to other project management steps).

Calculate the expected number of clients that will be served: This number was used throughout the planning process. One approach is to use the maximum passenger capacity for a given zone and assume a certain number (often 0.5-2) of devices per person.

Determine the number of APs needed: Although the APs do not have a hard client limit (they are limited by bandwidth, not number of clients), as a practical matter, 50 client sessions is a safe limit and is convenient for planning. To avoid too many active clients, enable power reduction, band steering, and ensure there are enough APs installed in the environment to support the required load.

Calculate the backhaul required: Network performance is often plagued by limited backhaul. To calculate the backhaul requirement, multiply the bandwidth limit by the expected number of clients. While it is unlikely that all devices will use up to their full bandwidth limit, this conservative calculation will minimize the odds that the backhaul is insufficient.

Maximize the number of APs that are connected to the wired network: This allows an AP to use the full bandwidth of its wired connection, rather than having to go through a neighboring AP via a mesh link. If possible, do not use any mesh APs.

Used multi-radio APs: With multi-radio APs, the wireless network can make optimal decisions about channel assignment, band steering, and mesh networking. This maximizes throughput and minimizes channel interference for clients. As planners, one has no control of the client technology used: some passengers may have newer clients; other passengers may have older clients. Higher throughput 802.11n clients can operate on the 5 GHz band without being slowed down by older 802.11b/g clients, which remain on the 2.4 GHz band. Moreover, if mesh links are necessary, they can be provided on multiple radios, significantly improving the performance of the network across multiple mesh hops.

Map the APs: Name the APs and place them on the map appropriately. The network decides a mesh route based partially on the locations of APs on the map.

Ensured signal strength: The signal strength between a client and an AP should be at least 20 dB for optimal stability and performance.

Budget for spare hardware: Spare hardware should be readily available in case of failures. For example, have an extra switch, APs, cables, and associated power supplies.

Some AP configuration settings taken into consideration include the following:

Enable bandwidth limits: When bandwidth limits are not enabled, a small number of clients can quickly saturate a channel. Higher limits (25-100 Mbps) will enable higher-bandwidth applications such as OTT; however, this requires that there be enough local and wide-area bandwidth available to support all users at this limit. Application traffic shaping can also be used; this allows the administrators to block applications that might be considered abusive, such as P2P file-sharing applications.

Use Distributed DHCP Scopes: Centralized DHCP servers often fail or become slow when hundreds or thousands of clients request an IP address in a short time. Using the appropriate NAT strategy, one can spread the DHCP load among all the switches.

Enable auto channel assignment (when appropriate): Auto channel assignment allows the Cloud Controller to assign channels to APs in the network using RF information that the APs constantly send up to the Cloud Controller. Unlike traditional wireless solutions, in which channel assignment decisions are made by each AP in a localized manner, the Cloud Controller ensures that channel assignments make sense locally as well as globally, relative to the rest of the network.

Enable Channel Spreading: Channel spreading enables APs in the same vicinity (e.g., in the same zone) to broadcast on different channels, so that channel utilization on each channel is minimized. This maximizes throughput and minimizes interference in the network.

Enable Band Steering: Band steering forces 5 GHz-capable wireless devices (e.g., most 802.11n clients) to migrate away from the 2.4 GHz band. This opens up radio spectrum for legacy wireless devices (e.g., 802.11b/g clients). This is highly beneficial since there are many more 5 GHz channels than 2.4 GHz channels.

Reduce Transmit Power: The reduction of transmit power enables administrators to create "microcells", such that a user associates only with the nearest AP in a room containing multiple APs. This guarantees an even distribution of users across the APs deployed in a physical space. This configuration allows for a greater number of individual channels, which might be desired in a high-density setup. This change is only applied to 5 GHz radios since 2.4 GHz radios already use 20 MHz channels by default.

Regarding proximity messaging and wayfinding applications, the use of virtual BLE (vBLE) technology enables one to deploy and move virtual beacons with the simple click of a mouse (or via APIs), eliminating the need for physical beacons.

Figure 8:
FIG. 8 is an example embodiment of a control interface.
Figure 9:
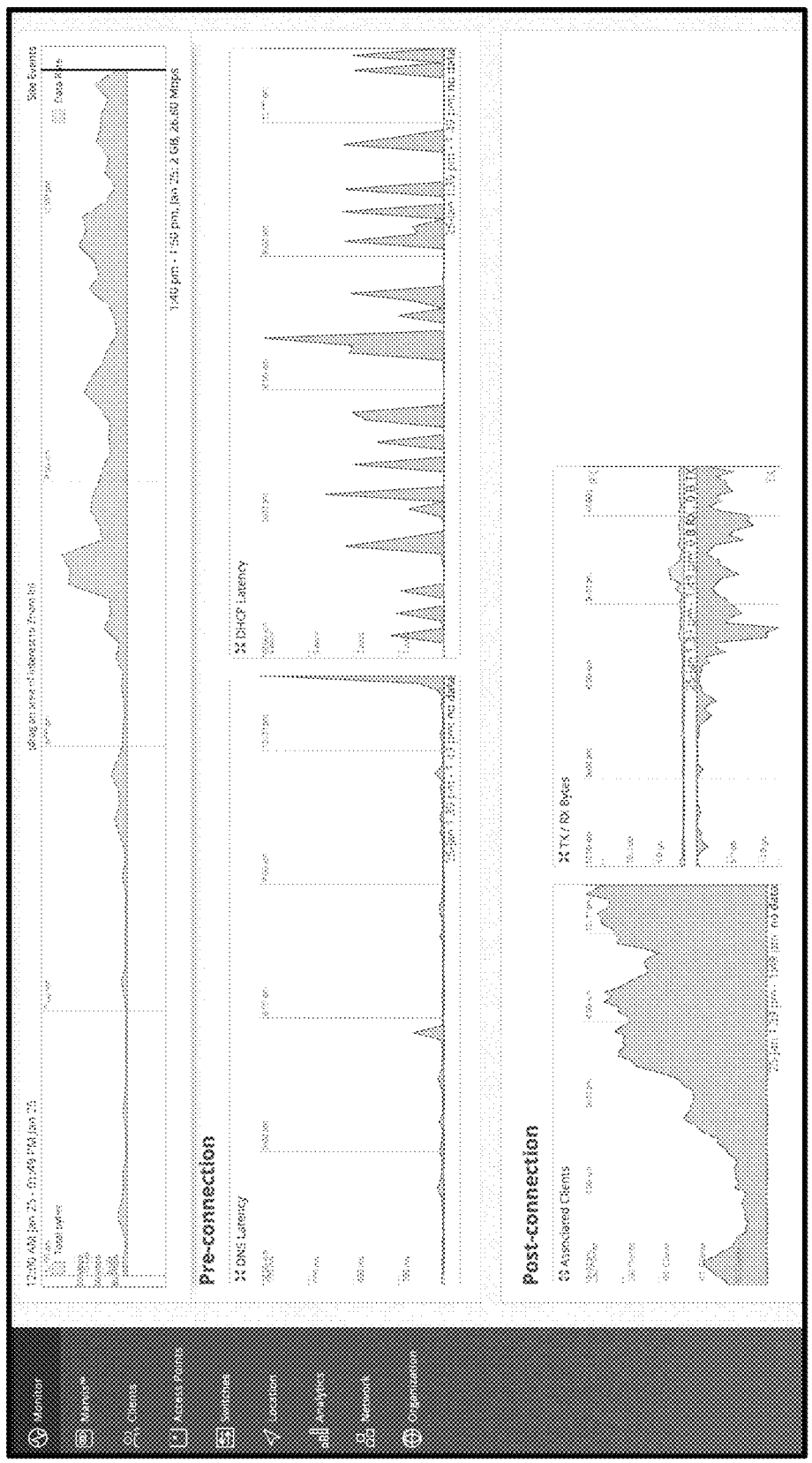
FIG. 9 is another example embodiment of a control interface.

FIGS. 8 & 9 are example embodiments of a control interface for two different environments (in this example, two different airports). These examples represent various aspects of a user interface (e.g., of superintegrated management system 150, see FIG. 2) as may be accessed by a first user 181, such as a venue operator.

Figure 10:
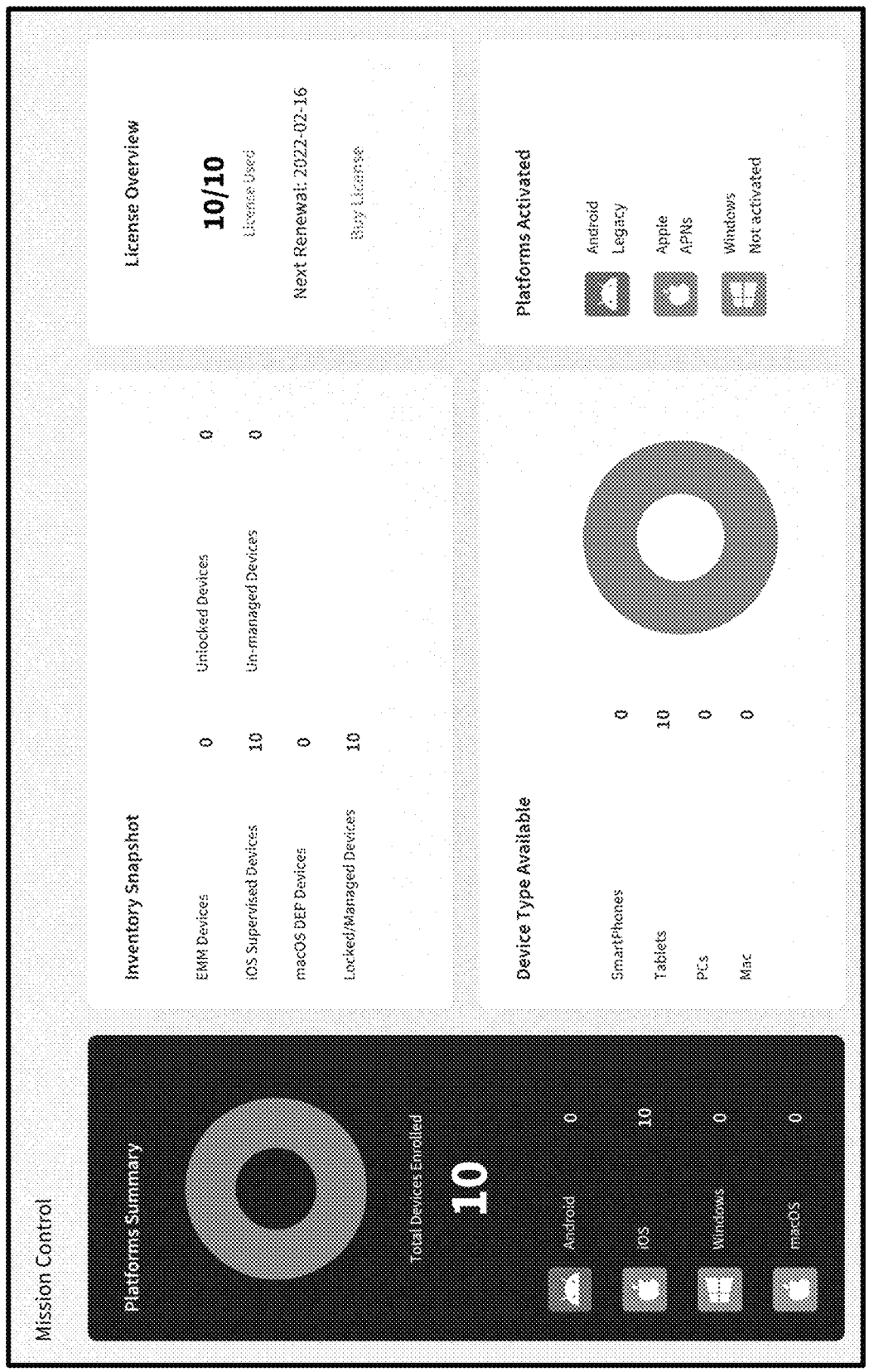
FIG. 10 is an example embodiment of a device management interface.

FIG. 10 is an example embodiment of a device management interface, which may be an interface of the superintegrated management system 150. This example interface may be accessible by a first user 181, such as a venue operator, or a second user 182, such as a vendor monitoring maintenance for the venue. The interface may provide data on devices connected to the network, such as an inventory snapshot (e.g., number of EMM devices, iOS supervised devices, managed or unmanaged devices, etc); a device type (e.g., smartphone, tablet, PC, Mac); licenses issued and number in use; and platforms operating on enrolled devices (e.g., Android, iOS, Windows, macOS).

Figure 11:
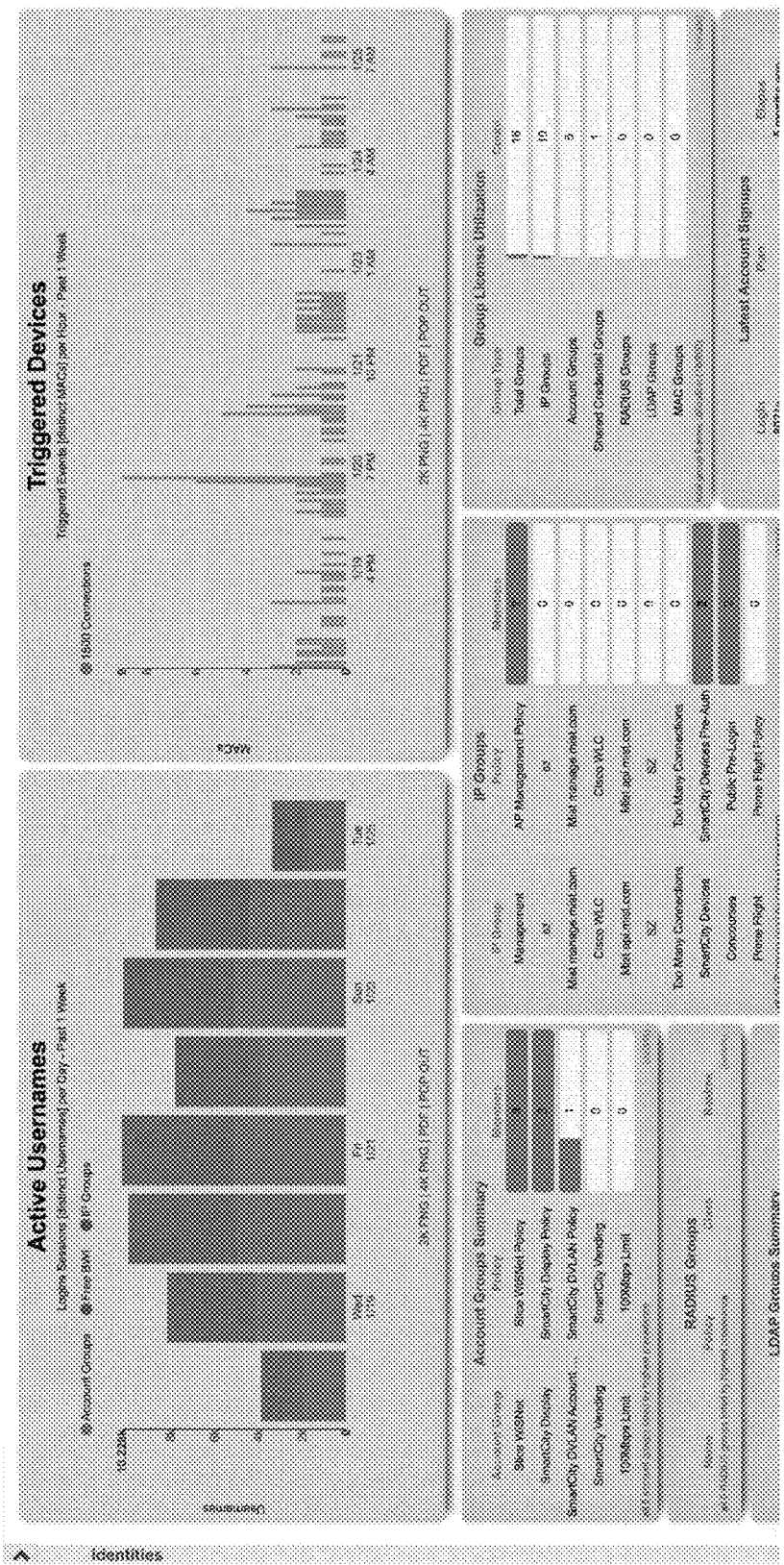
FIG. 11 is an example embodiment of an interface showing network accounts.
Figure 12:
FIG. 12 is an example embodiment of an interface showing networks.
Figure 13:
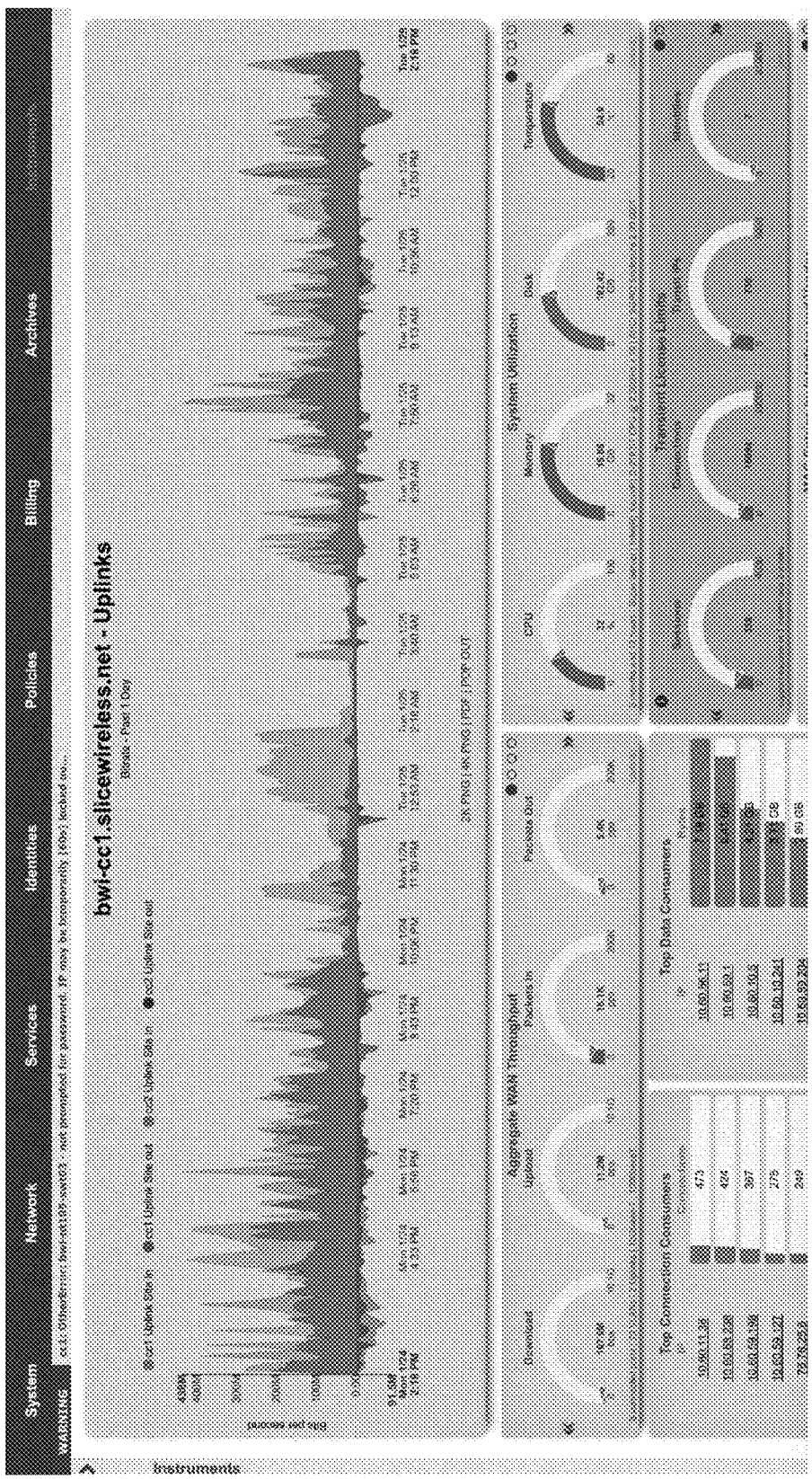
FIG. 13 is an example embodiment of an interface showing network data flow.

FIGS. 11-13 are example embodiments of interfaces showing, respectively, a network accounts view; a network uplink and interface view; and a network data flow view. These interfaces may be available to the network manager through the superintegrated management system 150. The interfaces may selectively be available to other users, based upon their specific permissions. An access interface as referred to herein may include hardware elements, software elements, or both, for example, a web portal, an app, directly accessing a database through the network, etc.

Figure 14:
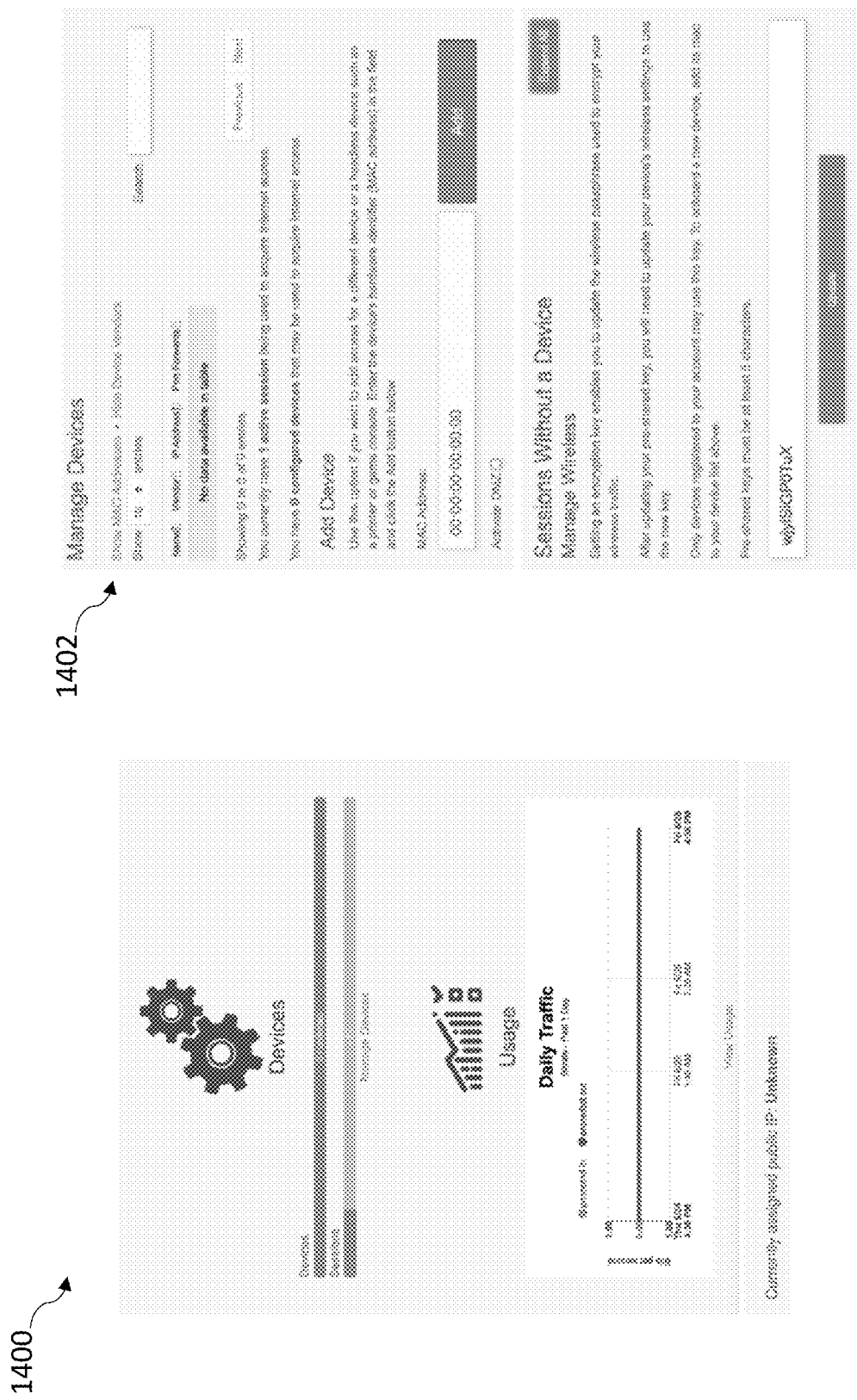
FIG. 14 illustrates two example embodiments of a user access portal.

FIG. 14 illustrates two examples of user access portals, 1400 and 1402. These portals may be configured to provide users with access to various services as described in any of the embodiments discussed herein.

Example II: Network Slicing—WiSNET Virtual Gateway

Figure 15:
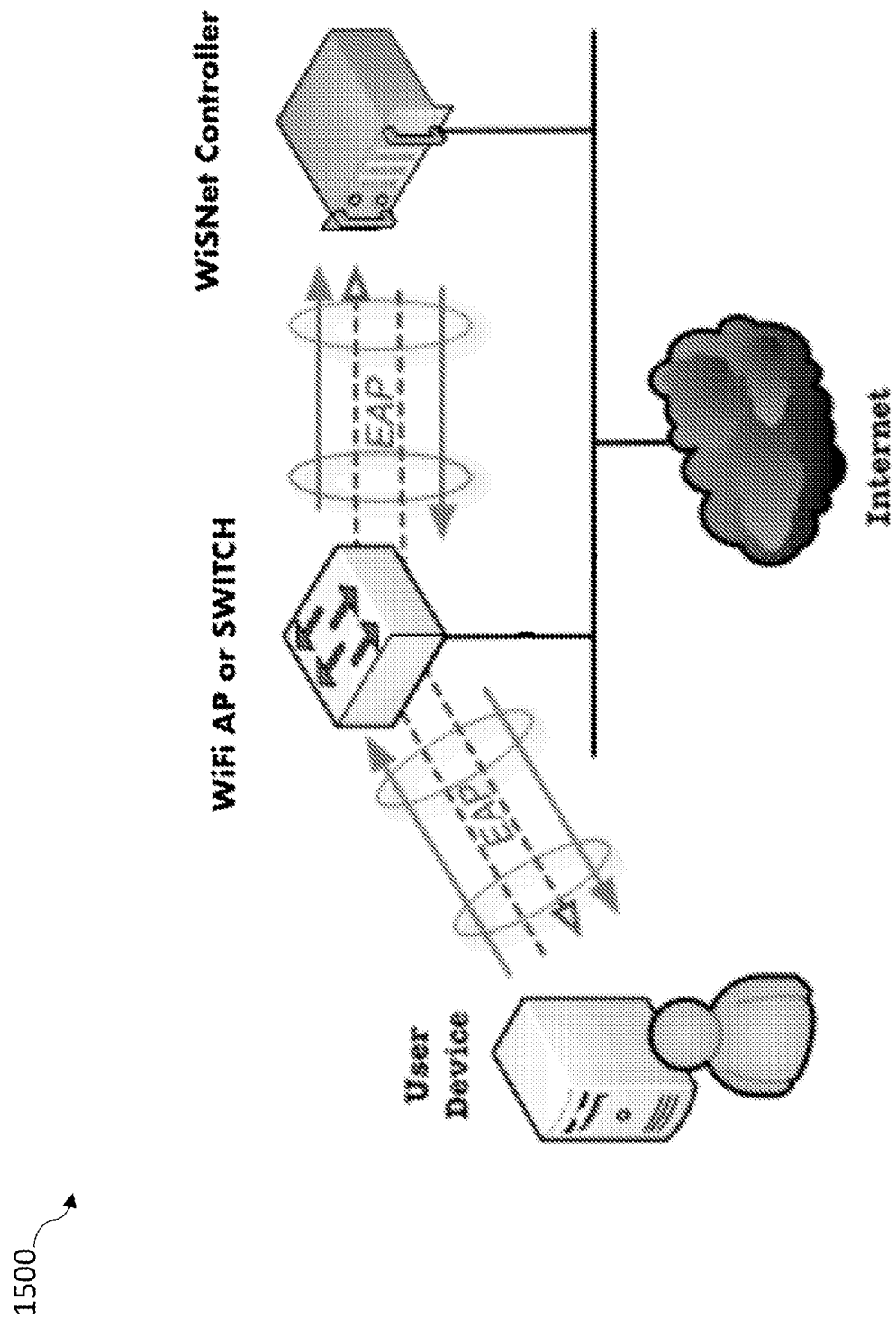
FIG. 15 illustrates an exemplary embodiment of a WiSNET 1500 including multiple networks or network slices.

FIG. 15 illustrates an exemplary embodiment of a WiSNET 1500 including multiple networks or network slices, with a Single wireless access point or Switch. The WiSNET gateway allows IT organizations to have multiple and separate secure networks while using the same access point (AP) or switch. Most commonly there will be one SSID for guest and one SSID for employees. Historically if you wanted to have two secure networks in one physical location you had to have two separate APs which would create RF interference and be costly. With WiSNET Gateway and DVLAN enabled, one AP can route two or more different SSIDS onto two or more different networks. The data is encrypted from the client to the controller. When the data is flowing through the AP it is still encrypted. This means the networks are completely separate and secure even though the traffic runs through the same AP or switch. This feature is very useful in environments where data privacy, separation and network security are critical.

Using DVLAN (segmentation technology) you can group users into their own network segment (VLAN) or have every user (device) in a separate VLAN—each with their own dedicated and secure network. Dynamic VLANs are typically deployed in enterprise networks to statically place devices into broadcast domains associated with their role in a corporation such as engineering, accounting, executive, etc. The WiSNET Wi-Fi solution has a unique capability that enables IT managers to micro-segment the network using Dynamic VLAN. Each visitor is placed into his or her own private virtual Wi-Fi network through the dynamic VLAN assignment. Each visitor cannot in any way affect or see the traffic headed to and from any of the other visitors.

The WiSNET Dynamic VLAN mechanism for network operators differs from a typical enterprise DVLAN approach in that the device to VLAN mapping is developed on the fly (as opposed to being statically defined by the network administrator). The operator configures the WiSNET Gateway to draw from one or more sets of VLANs. These VLANs may be congruent with static VLANs configured on switch ports and wired switches enabled with 802.1X. The assigned VLAN may change depending on many possible conditions, including but not limited to credentials supplied by the visitor to the captive portal, the current geo-spatial location of the device, the time of day, and more.

Placing guests into one or a small number of network segments opens the network infrastructure up to a broad spectrum of possible vulnerabilities. A single guest has the power to bring down the entire guest network. Accidental hijacking of the segment gateway is the most common form of end-user error that compromises the stability of the entire guest network. For example, end users may accidentally introduce a rogue DHCP server through mismanaged Internet connection sharing settings on their laptop. Alternatively, the end user might introduce a rogue DHCP server by improperly connecting a device that has an integrated DHCP server, such as an action camera, aerial drone, or personal hotspot device. Of course, the end user might also accidentally introduce an IP address conflict with the segment gateway due to mismanagement of the Ethernet interface settings.

Other features and examples of WiSNET embodiments are presented in a book by the inventors, Minoli and Dressendofer, *High Density and De-Densified Smart Campus Communications* (Wiley, 2022), which is hereby incorporated by reference as if fully recited herein. The following background material is also incorporated by reference in its entirety: D. Minoli, *Building the Internet of Things with IPv6 and MIPv6* (Wiley, 2013) If any material in these references is in conflict with this specification, the specification will control.

The embodiments of the wireless supernetwork and methods of use described herein are exemplary and numerous modifications, combinations, variations, and rearrangements can be readily envisioned to achieve an equivalent result, all of which are intended to be embraced within the scope of the appended claims. Further, nothing in the above-provided discussions of the wireless supernetwork and methods of use should be construed as limiting the invention to a particular embodiment or combination of embodiments. The scope of the invention is defined by the appended claims.

What is claimed is:

1. A wireless communications network for integrating input data from a plurality of service providers, the network comprising:
   a service delivery system comprising one or more network interfaces, each of the one or more network interfaces in communication with at least one of the plurality of service providers;
   wherein the service delivery system is configured to communicate with two or more service providers selected from the group consisting of: a wireless service provider, an internet service provider, a software as a service provider, an internet of things analytics service provider, and a content provider;
   a data aggregation system comprising a plurality of network gateways, the data aggregation system configured to receive input data, via the service delivery system, from each of the plurality of service providers, the data aggregation system further configured to provide aggregated input data;
   a local delivery system comprising a plurality of access points, the local delivery system configured to receive the aggregated input data from data aggregation system and transmit at least a portion of the aggregated input data to multiple categories of user via a superintegrated access platform; and a superintegrated management system comprising a processing system including a processor, the superintegrated management system in communication with the data aggregation system and the local delivery system, the superintegrated management system configured to assign a network slice to each of a plurality of user profiles, and further configured to report network property data to each of the multiple categories of user.

2. The network of claim 1, wherein the local delivery system is configured to transmit the at least a portion of the aggregated input data using a wireless communication protocol.

3. The network of claim 1, wherein the local delivery system is configured to transmit the aggregated input data using a wireless communication protocol belonging to an IEEE 802 family of standards.

4. The network of claim 1, wherein the multiple categories of user include a first user having access to view network property data relating to both the service delivery system and the local delivery system; a second user having access to configure at least one of a network slice and a service slice and to view network property data relating to the local delivery system; and a third user having access to communicate with local delivery system.

5. The network of claim 1, wherein at least one of the multiple categories of user has access, through the superintegrated access platform, to configure the network slice assigned by the superintegrated management system.

6. The network of claim 1, further having a network architecture including four or more architectural features selected from the group consisting of: a unified architecture; an open, integrated, unified platform and access technology; an internet protocol centric protocol suite; a consistent core technology; a unified administration; a secure communications environment; providing support for two or more disparate communications services; providing services which are extensible and tailorable; and an ecosystem supporting internet of things; 99.99% end to end service availability.

7. The network of claim 1, further including support for four or more technology features selected from the group consisting of: voice-related services; data-related services; wide area network related services; building management related services; cloud-supported services; video related services; and artificial intelligence related services.

8. The network of claim 1, further including a performance monitoring system configured to monitor performance of the entire network including at least hardware status diagnosis, traffic monitoring, and network overload detection.

9. The network of claim 8, wherein the performance monitoring system is configured to rebalance network traffic between a plurality of nodes of the local delivery system.

10. The network of claim 8, wherein the performance monitoring system is configured to provide a network performance data visualization.

11. The network of claim 1, wherein the local delivery system is configured to perform address management across the superintegrated access platform.

12. The network of claim 1, wherein the local delivery system is configured to provide adjustable data traffic parameters.

13. The network of claim 1, further including a service creation interface configured to provide a front-end user service interface and a back-end user service interface.

14. A communications network for integrating input data from a plurality of service providers, the network comprising:

a service delivery system comprising one or more network interfaces, each of the one or more network interfaces in communication with at least one of the plurality of service providers;

wherein the service delivery system is configured to communicate with two or more service providers selected from the group consisting of: a wireless service provider, an internet service provider, a software as a service provider, an internet of things analytics service provider, and a content provider;

a data aggregation system comprising a plurality of network gateways, the data aggregation system configured to receive input data, via the service delivery system, from each of the plurality of service providers, the data aggregation system further configured to provide aggregated input data;

a local delivery system comprising a plurality of access points, the local delivery system configured to receive the aggregated input data from the data aggregation system and transmit at least a portion of the aggregated input data to multiple categories of user via a superintegrated access platform;

a superintegrated management platform comprising a processing system including a processor, the superintegrated management system in communication with the data aggregation system and the local delivery system, the superintegrated management system configured to assign a network slice to each of a plurality of user profiles, and further configured to report network property data to each of the multiple categories of user; and wherein the local delivery system is configured to transmit the at least a portion of the aggregated input data using at least one of a wireless networking technology and a wired networking technology.

15. A method of providing wireless data communication by integrating input data from a plurality of service providers, the method comprising:

receiving, by a service delivery system comprising one or more network interfaces, input data from the plurality of service providers;

wherein the service delivery system is configured to communicate with two or more service providers selected from the group consisting of: a wireless service provider, an internet service provider, a software as a service provider, an internet of things analytics service provider, and a content provider;

aggregating, by a data aggregation system comprising a plurality of network gateways, the input data from each of the plurality of service providers;

providing aggregated input data, from the data aggregation system to a local delivery system, the local delivery system comprising a plurality of access points; and transmitting, by the local delivery system, at least a portion of the aggregated input data to multiple categories of user via a superintegrated access platform;

assigning, by a superintegrated management system comprising a processing system including a processor, the superintegrated management system in communication with the data aggregation system and the local delivery system, a network slice to each of a plurality of user profiles; and reporting, by the superintegrated management system, network property data to each of the multiple categories of user.

16. The method of claim 15, further including:

providing four or more architectural features selected from the group consisting of: a unified architecture; an open, integrated, unified platform and access technology; an internet protocol centric protocol suite; a consistent core technology; a unified administration; a secure communications environment; an ecosystem supporting internet of things; and 99.99% end to end service availability.

17. The method of claim 15, further including:

providing support for four or more technology features selected from the group consisting of: voice-related services; data-related services; wide area network related services; building management related services; cloud-supported services; video related services; and artificial intelligence related services.

18. The method of claim 15, further including:

monitoring, by a performance monitoring system including a processor, performance of the entire network including at least hardware status diagnosis, traffic monitoring, and network overload detection.

19. The method of claim 18, further including:

rebalancing network traffic between a plurality of nodes of the local delivery system, by the performance monitoring system.

20. A superintegrated access platform for a wireless communications network integrating input data from a plurality of service providers, the wireless communications network having a local delivery system, the platform comprising:

a communications interface in communication with the local delivery system;

wherein the local delivery system provides aggregated input data from the plurality of service providers;

wherein two or more of the plurality of service providers are selected from the group consisting of: a wireless service provider, an internet service provider, a software as a service provider, an internet of things analytics service provider, and a content provider;

wherein the aggregated input data includes input data from each of the plurality of service providers;

an access interface configured to transmit at least a portion of the aggregated input data to each of three categories of user, via a standard wireless communication protocol;

wherein the three categories of user include an asset manager, an intra-network service manager, and an end client.

* * * * *